United States Patent
Clark et al.

(10) Patent No.: US 11,732,596 B2
(45) Date of Patent: Aug. 22, 2023

(54) CERAMIC MATRIX COMPOSITE TURBINE VANE ASSEMBLY HAVING MINIMALISTIC SUPPORT SPARS

(71) Applicant: Rolls-Royce plc, London (GB)

(72) Inventors: Daniel Clark, Derby (GB); Michael J. Whittle, Derby (GB); Carl Boettcher, Nottingham (GB); David C. Wright, Loughborough (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/560,233

(22) Filed: Dec. 22, 2021

(65) Prior Publication Data

US 2023/0193773 A1 Jun. 22, 2023

(51) Int. Cl.
| | |
|---|---|
| F01D 5/14 | (2006.01) |
| F01D 9/06 | (2006.01) |
| F01D 5/28 | (2006.01) |

(52) U.S. Cl.
CPC ............. *F01D 9/065* (2013.01); *F01D 5/147* (2013.01); *F01D 5/282* (2013.01); *F01D 5/284* (2013.01); *F05D 2240/12* (2013.01); *F05D 2300/6033* (2013.01)

(58) Field of Classification Search
CPC ........... F01D 5/147; F01D 5/282; F01D 5/284
See application file for complete search history.

(56) References Cited

U.S. PATENT DOCUMENTS

| | | | |
|---|---|---|---|
| 3,302,926 A | 2/1967 | Melvin | |
| 4,126,405 A | 12/1978 | Bobo et al. | |
| 4,987,736 A * | 1/1991 | Ciokajlo | F01D 25/162 |
| | | | 60/797 |
| 5,078,576 A | 1/1992 | Hayton | |
| 5,269,651 A | 12/1993 | Ostermeir et al. | |
| 6,164,903 A | 12/2000 | Kouris | |
| 6,290,459 B1 | 9/2001 | Correia | |
| 6,325,593 B1 | 12/2001 | Darkins, Jr. et al. | |
| 6,503,051 B2 | 1/2003 | Predmore | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 6,860,716 B2 | 3/2005 | Czachor et al. | |
| 6,884,030 B2 | 4/2005 | Darkins, Jr. et al. | |
| 6,887,040 B2 | 5/2005 | Tiemann et al. | |
| 7,008,185 B2 | 3/2006 | Peterman et al. | |
| 7,094,026 B2 | 8/2006 | Coign et al. | |
| 7,101,150 B2 | 9/2006 | Bash et al. | |
| 7,114,917 B2 | 10/2006 | Leg | |
| 7,452,182 B2 * | 11/2008 | Vance | F01D 5/14 |
| | | | 415/189 |
| 7,452,189 B2 | 11/2008 | Shi et al. | |

(Continued)

FOREIGN PATENT DOCUMENTS

WO 2011047693 4/2001

*Primary Examiner* — Michael L Sehn

(74) *Attorney, Agent, or Firm* — Barnes & Thornburg LLP

(57) ABSTRACT

A turbine vane assembly adapted for use in a gas turbine engine includes a plurality of turbine vanes, an outer vane support, and an inner vane support. The plurality of turbine vanes comprise ceramic matrix composite material and are adapted to interact with hot gases flowing through a gas path of the gas turbine engine during use of the turbine vane assembly. A spar system couples the inner vane support with the outer vane support.

18 Claims, 12 Drawing Sheets

(56) References Cited

U.S. PATENT DOCUMENTS

| | | |
|---|---|---|
| 7,540,709 B1 | 6/2009 | Ebert |
| 7,588,414 B2 | 9/2009 | Wunderlich et al. |
| 7,762,766 B2 | 7/2010 | Shteyman et al. |
| 7,824,152 B2 | 11/2010 | Morrison |
| 8,070,427 B2 | 12/2011 | Snook et al. |
| 8,128,354 B2 | 3/2012 | Hansen et al. |
| 8,240,986 B1 | 8/2012 | Elbert |
| 8,356,981 B2 | 1/2013 | Cooke et al. |
| 8,371,127 B2 | 2/2013 | Durocher et al. |
| 8,371,812 B2 | 2/2013 | Manteiga et al. |
| 8,382,440 B2 * | 2/2013 | Baker .................. F03D 1/0683 416/226 |
| 8,454,303 B2 | 6/2013 | Garcia-Crespo |
| 8,511,982 B2 | 8/2013 | Hart et al. |
| 8,668,440 B2 | 3/2014 | Butler et al. |
| 8,864,451 B2 | 10/2014 | Piggott et al. |
| 9,017,013 B2 | 4/2015 | Laurello et al. |
| 9,097,141 B2 | 8/2015 | Paradis |
| 9,309,783 B2 | 4/2016 | Nallam et al. |
| 9,546,557 B2 | 1/2017 | Grooms, III et al. |
| 9,631,515 B2 | 4/2017 | Oyarbide et al. |
| 9,816,387 B2 | 11/2017 | Carr et al. |
| 9,863,259 B2 | 1/2018 | Boeke et al. |
| 9,863,260 B2 | 1/2018 | Weaver |
| 9,890,663 B2 | 2/2018 | Scott |
| 9,915,159 B2 | 3/2018 | Huizenga et al. |
| 9,915,170 B2 | 3/2018 | Winn et al. |
| 10,030,538 B2 | 7/2018 | Hernandez et al. |
| 10,053,998 B2 | 8/2018 | Vo et al. |
| 10,054,009 B2 | 8/2018 | Scott |
| 10,072,516 B2 * | 9/2018 | Carr .................. F01D 9/041 |
| 10,094,239 B2 | 10/2018 | Freeman et al. |
| 10,113,436 B2 | 10/2018 | Rioux et al. |
| 10,161,257 B2 | 12/2018 | Huizenga et al. |
| 10,174,627 B2 | 1/2019 | Chang et al. |
| 10,180,073 B2 | 1/2019 | Tuertscher et al. |
| 10,190,426 B2 | 1/2019 | Fremont |
| 10,233,764 B2 | 3/2019 | Thomas et al. |
| 10,309,240 B2 | 6/2019 | Heitman et al. |
| 10,329,937 B2 | 6/2019 | Boeke et al. |
| 10,337,340 B2 | 7/2019 | Cortequisse |
| 10,400,616 B2 | 9/2019 | Tuertscher et al. |
| 10,465,540 B2 | 11/2019 | Carr et al. |
| 10,612,402 B2 | 4/2020 | Freeman et al. |
| 10,655,482 B2 | 5/2020 | Freeman et al. |
| 10,815,806 B2 | 10/2020 | Correia et al. |
| 10,890,076 B1 | 1/2021 | Whittle |
| 10,961,857 B2 | 3/2021 | Whittle et al. |
| 10,975,708 B2 | 4/2021 | Whittle et al. |
| 11,047,247 B2 | 6/2021 | Whittle |
| 11,073,039 B1 | 7/2021 | Whittle et al. |
| 11,146,559 B2 | 10/2021 | Whittle et al. |
| 2004/0253096 A1 | 12/2004 | Legg |
| 2009/0238683 A1 | 9/2009 | Alvanos et al. |
| 2014/0161623 A1 | 6/2014 | Zurmehly et al. |
| 2014/0234118 A1 | 8/2014 | Beaujard et al. |
| 2014/0255174 A1 | 9/2014 | Duelm et al. |
| 2015/0093249 A1 | 4/2015 | Lang et al. |
| 2016/0123163 A1 | 5/2016 | Freeman et al. |
| 2016/0123164 A1 | 5/2016 | Freeman et al. |
| 2016/0201488 A1 | 7/2016 | Carr et al. |
| 2017/0022833 A1 | 1/2017 | Heitman et al. |
| 2017/0051619 A1 | 2/2017 | Tuertscher |
| 2017/0108743 A1 | 4/2017 | Humhauser et al. |
| 2018/0017074 A1 | 1/2018 | Shanti et al. |
| 2018/0045117 A1 | 2/2018 | Groves, II et al. |
| 2018/0223680 A1 | 8/2018 | Hafner |
| 2018/0238181 A1 | 8/2018 | Reynolds et al. |
| 2018/0238184 A1 | 8/2018 | Reynolds et al. |
| 2018/0306063 A1 | 10/2018 | Shoemaker et al. |
| 2018/0328187 A1 | 11/2018 | Oke |
| 2018/0340431 A1 | 11/2018 | Kerns et al. |
| 2018/0370158 A1 | 12/2018 | Gallier et al. |
| 2019/0153883 A1 | 5/2019 | Kim |
| 2020/0340370 A1 | 10/2020 | Whittle et al. |
| 2021/0108524 A1 | 4/2021 | Whittle et al. |
| 2021/0140333 A1 | 5/2021 | Whittle et al. |
| 2021/0207486 A1 | 7/2021 | Sadler et al. |

* cited by examiner

CERAMIC MATRIX COMPOSITE TURBINE VANE ASSEMBLY HAVING MINIMALISTIC SUPPORT SPARS

FIELD OF THE DISCLOSURE

The present disclosure relates generally to gas turbine engines, and more specifically to turbine vane assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature-resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

A turbine vane assembly for use in a gas turbine engine may include a ceramic matrix composite vane, a metallic vane support, and a spar system. The ceramic matrix composite vane may be adapted to interact with hot gases flowing through a gas path of the gas turbine engine during use of the turbine vane assembly. The metallic vane support assembly may extend circumferentially relative to the axis and may be configured to receive loads applied to the ceramic matrix composite vane during use of the turbine vane assembly. The spar system may extend between components of the metallic vane support.

In some embodiments, the ceramic matrix composite vane may include an outer platform, an inner platform, and an airfoil. The inner platform may be spaced apart radially from the outer platform relative to an axis to define the gas path therebetween. The airfoil may extend radially between the outer platform and the inner platform.

In some embodiments, the metallic vane support assembly may include an outer vane support and an inner vane support. The outer vane support may be located radially outward of the outer platform of the ceramic matrix composite vane. The inner vane support may be located radially inward of the inner platform of the ceramic matrix composite vane.

In some embodiments, the spar system may include a first spar and a second spar. The first spar may extend radially inward from the outer vane support through an interior cavity of the ceramic matrix composite vane and couple with the inner vane support so as to transfer loads applied to the inner vane support to the outer vane support. The second spar may be spaced apart axially from the first spar relative to the axis. The second spar may extend radially inward from the outer vane support through the interior cavity of the ceramic matrix composite vane and couple with the inner vane support to transfer the loads applied to the inner vane support to the outer vane support and block twisting of the ceramic matrix composite vane during use of the turbine vane assembly.

In some embodiments, the outer vane support may include an outer mount platform, a first spar mount extension, and a second spar mount extension. The outer mount platform may extend circumferentially at least partway about the axis. The outer mount platform may be configured to be coupled to a turbine case of the gas turbine engine. The first spar mount extension may extend radially from the outer mount platform. The second spar mount extension may be spaced apart axially from the first spar mount extension. The second spar mount extension may extend radially from the outer mount platform.

In some embodiments, the first spar may extend radially through the outer mount platform into the first spar mount extension and the second spar may extend radially through the outer mount platform into the second spar mount extension. In this way, terminal ends of the first and second spars may extend radially outward of the outer mount platform.

In some embodiments, the first spar may be welded to the outer vane support at one of the terminal ends of the first spar and the first spar mount extension of the outer vane support and an intersection of the first spar and a radially-inward facing surface of the outer mount platform of the outer vane support. In some embodiments, the first spar may be welded to the outer vane support at both the terminal end of the first spar and the first spar mount extension of the outer vane support and the intersection of the first spar and a radially-inward facing surface of the outer mount platform of the outer vane support.

In some embodiments, a radially outer end of the first spar may be threaded. The first spar mount extension may be configured to mate with threads on the radially outer end of the first spar.

In some embodiments, the spar system may further include a spar shield. The spar shield may extend radially between the outer mount platform and the inner vane support through the interior cavity of the ceramic matrix composite vane.

In some embodiments, the spar shield may include an exterior surface and an interior surface. The exterior surface may face the interior cavity of the ceramic matrix composite vane. The interior surface may define an inner passageway. The first and second spars may extend through the inner passageway of the spar shield so that the spar shield is located between the ceramic matrix composite vane and the first and second spars.

In some embodiments, the spar shield may be shaped to define a leading edge, a trailing edge spaced apart axially from the leading edge, a pressure side, and a suction side spaced apart circumferentially form the pressure side. The pressure and suction sides may extend between and interconnect the leading and trailing edges.

In some embodiments, the spar shield may further include cooling features. The cooling features may be spaced apart along one of the pressure side and the suction side. The cooling features may extend from the exterior surface of the spar shield toward the ceramic matrix composite vane.

In some embodiments, the spar system may further include a plurality of spar plates. The plurality of spar plates may be stacked radially between the outer mount platform and the inner vane support.

In some embodiments, the plurality of spar plates may cooperate to form an outer profile with an airfoil shape. The airfoil shape may have a leading edge, a trailing edge spaced apart axially from the leading edge, a pressure side, and a suction side spaced apart circumferentially form the pressure side. The pressure and suction sides may extend between and interconnect the leading and trailing edges. The first and second spars may extend radially through the plurality of spar plates.

In some embodiments, the outer vane support may include an outer mount platform and a spar mount extension. The outer mount platform may extend circumferentially at least partway about the axis. The outer mount platform may be configured to be coupled to a turbine case of the gas turbine engine. The spar mount extension may extend radially from the outer mount platform.

In some embodiments, the first and second spars may extend radially through the outer mount platform into the spar mount extension. The first and second spars may extend radially through the outer mount platform into the spar mount extension so that terminal ends of the first and second spars extend radially outward of the outer mount platform.

In some embodiments, the first spar may have a circular cross section. The second spar may have an oblong cross section.

In some embodiments, the inner vane support may include an inner mount platform and an airfoil-shaped ridge. The inner mount platform may extend circumferentially at least partway about the axis. The airfoil-shaped ridge may extend radially outward form the inner mount platform.

In some embodiments, the vane may further include an inner mount. The inner mount may extend radially inward from the inner platform. The airfoil-shaped ridge may receive the inner mount of the vane and may be engaged with the inner mount to transfer the force loads.

According to another aspect of the present disclosure, a turbine vane assembly for use in a gas turbine engine may include a vane, a vane support assembly, and a spar system. The vane may include an outer platform, an inner platform spaced apart radially from the outer platform relative to an axis, and an airfoil that extends radially between the outer platform and the inner platform. The vane support assembly may include an outer vane support located radially outward of the outer platform of the vane and an inner vane support located radially inward of the inner platform of the vane.

In some embodiments, the spar system may include a first spar and a second spar. The first spar may extend radially inward from the outer vane support through an interior cavity of the vane and couple with the inner vane support. The second spar may be spaced apart axially from the first spar relative to the axis. The second spar may extend radially inward from the outer vane support through the interior cavity of the vane and couple with the inner vane support.

In some embodiments, the outer vane support may include an outer mount platform, a first spar mount extension, and a second spar mount extension. The outer mount platform may extend circumferentially at least partway about the axis. The first spar mount extension may extend radially from the outer mount platform. The second spar mount extension may be spaced apart axially from the first spar mount extension. The second spar mount extension may extend radially from the outer mount platform.

In some embodiments, the first spar may extend radially through the outer mount platform into the first spar mount extension and the second spar may extend radially through the outer mount platform into the second spar mount extension. In this way, terminal ends of the first and second spars may be located radially outward of the outer mount platform.

In some embodiments, the first spar may be welded to the outer vane support at one of the terminal ends of the first spar and the first spar mount extension of the outer vane support and an intersection of the first spar and a radially-inward facing surface of the outer mount platform of the outer vane support. In some embodiments, a radially outer end of the first spar may be threaded and the first spar mount extension may be configured to mate with threads on the radially outer end of the first spar.

In some embodiments, the spar system may further include a spar shield. The spar shield may extend radially between the outer vane support and the inner vane support through the interior cavity of the vane. The first and second spars may extend through the spar shield so that the spar shield is located between the vane and the first and second spars.

In some embodiments, the spar system may further include a plurality of spar plates. The plurality of spar plates may be stacked radially between the outer vane support and the inner vane support. The plurality of spar plates may cooperate to form an outer profile with an airfoil shape. The first and second spars may extend radially through the plurality of spar plates.

In some embodiments, the first spar may have a circular cross section. The second spar may have an oblong cross section.

In some embodiments, the inner vane support may include an inner mount platform and an airfoil-shaped ridge. The inner mount platform may extend circumferentially at least partway about the axis. The airfoil-shaped ridge may extend radially outward form the inner mount platform.

In some embodiments, the vane may further include an inner mount. The inner mount may extend radially inward from the inner platform. The airfoil-shaped ridge may receive the inner mount of the vane and may be engaged with the inner mount to transfer the force loads.

According to another aspect of the present disclosure, a method may include providing a vane comprising ceramic matrix composite materials, a vane support assembly comprising metallic materials, and a spar system. The vane may include an outer platform, an inner platform spaced apart radially from the outer platform relative to an axis, an airfoil that extends from the outer platform to the inner platform. The vane support assembly may include an inner vane support and an outer vane support. The spar system may include a first spar and a second spar.

In some embodiments, the method further includes coupling a first radial end of the first spar to the outer vane support and coupling a first radial end of the second spar to the outer vane support. The first radial end of the second spar may be coupled to the outer vane support at a location spaced apart axially from the first spar relative to the axis.

In some embodiments, the method further includes arranging the first spar to extend radially inward through an interior cavity of the vane and arranging the second spar to extend radially through the interior cavity of the vane. In this way, the outer vane support may be located radially outward of the outer platform of the vane.

In some embodiments, the method further includes coupling a second radial end of the first spar spaced apart radially from the first radial end of the first spar to the inner vane support and coupling a second radial end of the second spar spaced apart radially from the first radial end of the second spar to the inner vane support. In this way, the inner vane support may be spaced apart radially from the outer vane support relative to the axis to locate the vane radially therebetween.

These and other features of the present disclosure will become more apparent from the following description of the illustrative embodiments.

DETAILED DESCRIPTION OF THE DRAWINGS

Figure 1:
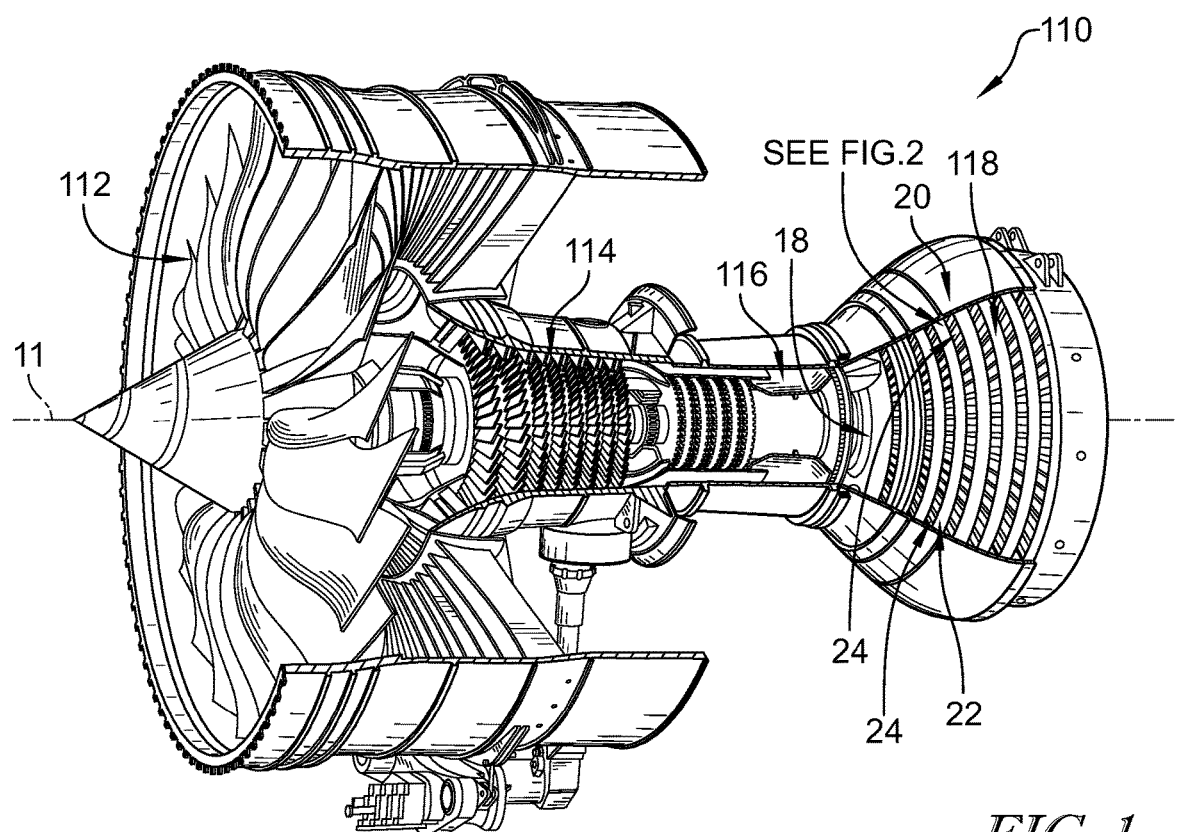
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 2:
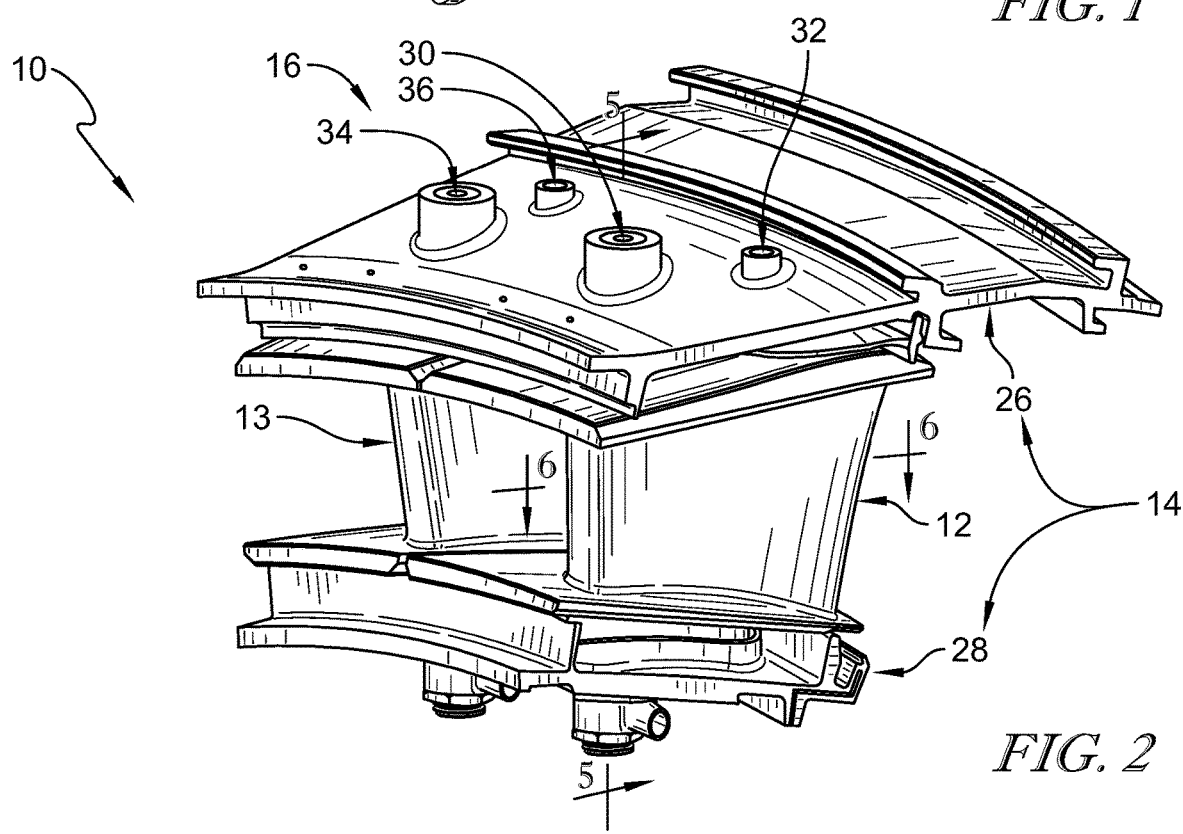
FIG. 2 is a perspective view of a turbine vane assembly of one of the static turbine vane rings in the gas turbine engine of FIG. 1 showing the turbine vane assembly includes a plurality of turbine vanes adapted to interact with hot gases flowing through a gas path of the gas turbine engine, a vane support assembly that extends circumferentially relative to the axis and is configured to receive loads applied to the ceramic matrix composite vane during use of the turbine vane assembly, and a spar system that extends between and interconnects an outer vane support and an inner vane support included in the vane support assembly.

A turbine vane assembly 10 for use in a gas turbine engine 110 is shown in FIG. 2. The turbine vane assembly 10 includes a turbine vane 12, 13, a metallic vane support assembly 14, and a spar system 16 as shown in FIGS. 2-5. The turbine vane 12, 13 interacts with hot gases conducted through a gas path 18 of the gas turbine engine 110 and conducts the hot gases around the turbine vane assembly 10 toward a rotating wheel assembly 24 located downstream of the turbine vane assembly 10 as suggested in FIG. 4. The metallic vane support assembly 14 has an outer vane support 26 and an inner vane support 28 that each extend circumferentially relative to an axis 11. The vane support assembly 14 is configured to receive loads applied to the vane 12, 13 during use of the turbine vane assembly 10. The spar system 16 is configured to provide a mechanical linkage between the outer and inner vane support 26, 28 and reduce twisting of the turbine vane assembly 10 during use of the turbine vane assembly 10 in the gas turbine engine 110.

The illustrative turbine vane assembly 10 is formed as a doublet having two vanes 12, 13. In other embodiments, the turbine vane assembly is a singlet with a single vane 12. In other embodiments, the turbine vane assembly includes more than two vanes.

The vane 12, 13 comprises ceramic materials, while the outer vane support 26, the inner vane support 28, and the spar system 16 comprise metallic materials in the illustrative embodiment. As such, the ceramic matrix composite vane 12, 13 is adapted to withstand high temperatures, but may have relatively low strength compared to the metallic components 16. The metallic vane support assembly 14 and the spar system 16 provide structural strength to the turbine vane assembly 10 by receiving the force loads applied to the vanes 12 and transferring them to a casing 20 that surrounds the turbine vane assembly 10.

Figure 3:
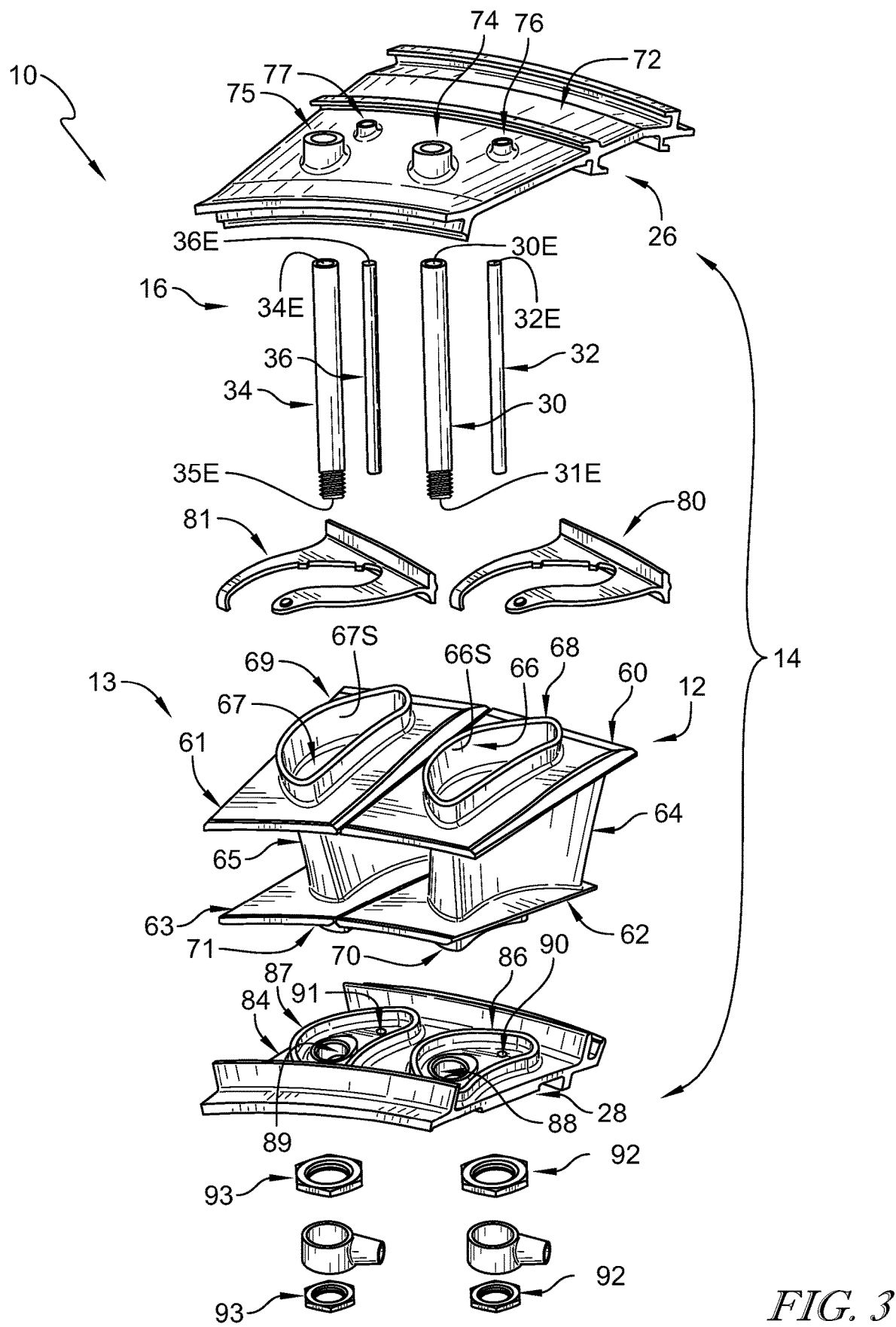
FIG. 3 is an exploded view of the turbine vane assembly of FIG. 2 showing the vane support assembly includes the outer vane support located radially outward of the vane and the inner vane support located radially inward of the vane, the spar system includes a first spar configured to be coupled to the outer and inner vane supports to transfer the force loads from the inner vane support to the outer vane support and a second spar configured to be coupled to the outer and inner vane supports to prevent twisting of the vane during use of the turbine vane, and the outer vane support includes spar mount extensions that are configured to receive terminal ends of the first and second spars.
Figure 6:
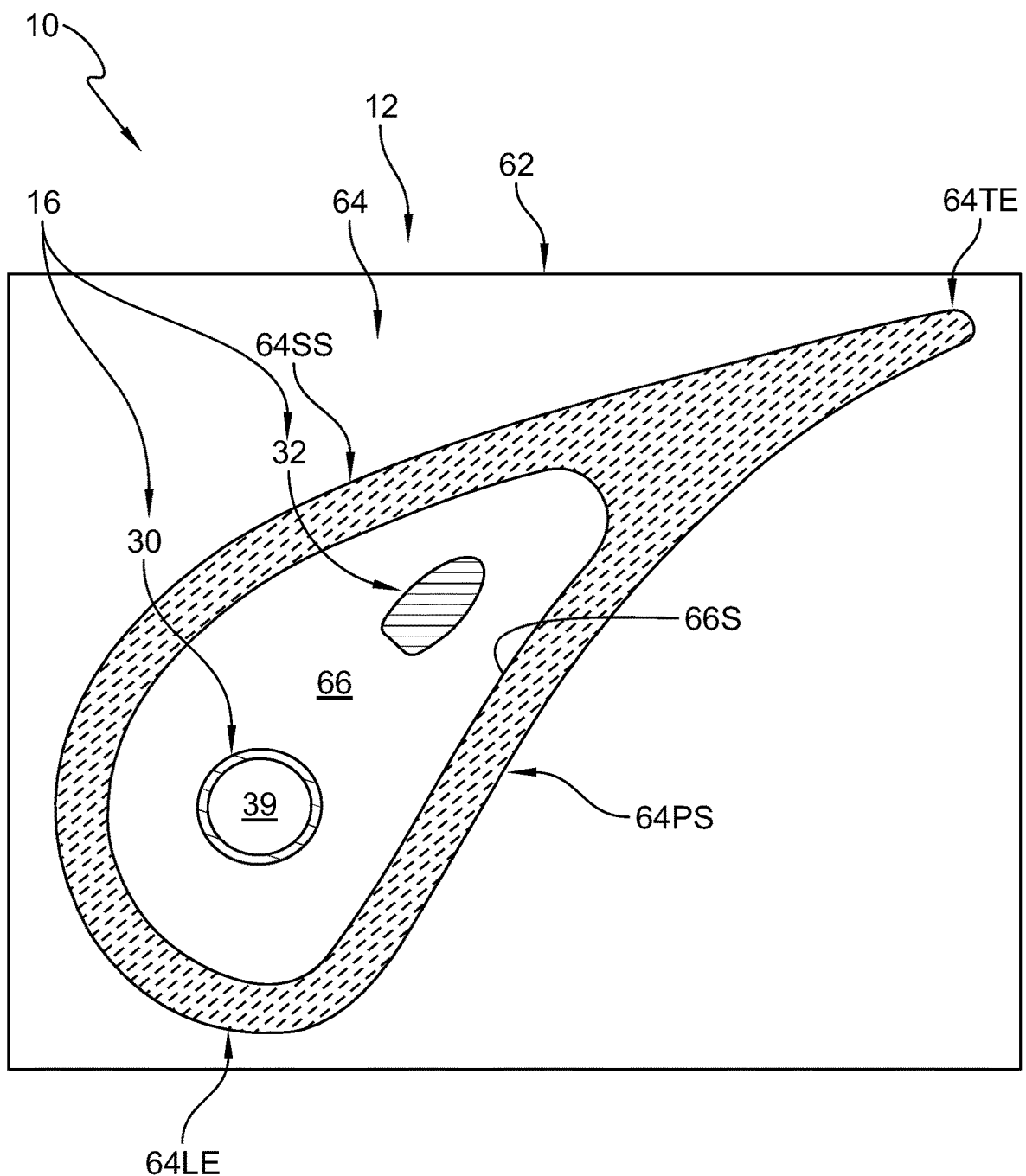
FIG. 6 is a diagrammatic section view of the turbine vane assembly of FIG. 2 taken along line 6-6 showing the first support spar has a circular shape and the second support spar has an oblong shape.

The spar system 16 includes a first spar 30, 34 and a second spar 32, 36 as shown in FIGS. 3 and 6. Both the first spar 30, 34 and the second spar 32, 36 extend radially inward from the outer vane support 26 through an interior cavity 66, 67 of the vane 12, 13. The first spar 30, 34 couples with the inner vane support 28 so as to transfer loads applied to the inner vane support 28 to the outer vane support 26. The second spar 32, 36 is spaced apart axially from the first spar 30, 34 relative to the axis 11. The second spar 32, 36 couples with the inner vane support 28 to prevent or block twisting of the vane 12, 13 during use of the turbine vane assembly 10.

The first spar 30, 32 and the second spar 34, 36 are spaced apart from an interior surface 66S, 67S of the interior cavity 66, 67 of the vane 12, 13 so as not to contact the vane 12, 13. The aerodynamic loads applied to the vane 12, 13 are transferred at outer and inner mounts 68, 69, 70, 71 of the vane 12, 13. The spar 30, 34 extend between the outer and inner vane supports 26, 28 through the vane 12, 13 to increase stiffness of the turbine vane assembly 10 and transfer loads from the inner vane support 28 to the outer vane support 26. The spar 32, 36 extend between the outer and inner vane supports 26, 28 through the vane 12, 13 to anti-rotate the assembly 10.

Turning again to the turbine vane assembly 10, the turbine vane assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112. In other embodiments, the fan 112 may be omitted and the turbine 118 drives a propeller, drive shaft, or other suitable alternative.

Figure 4:
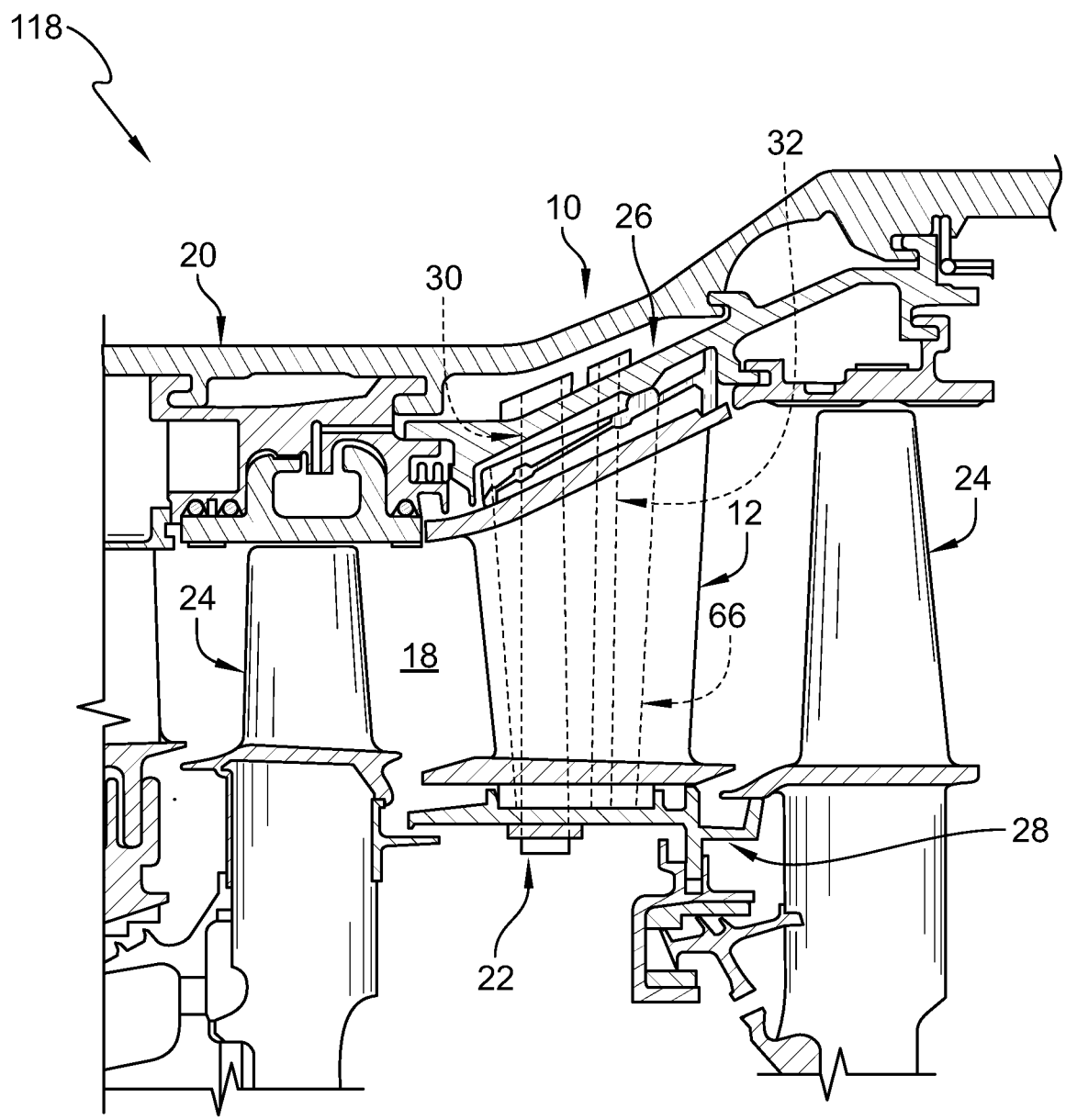
FIG. 4 is a section view of a portion of the turbine included in the gas turbine engine of FIG. 1 showing the turbine vane assembly and portion of the turbine casing and rotating wheel assemblies.

The turbine 118 includes a turbine case 20, a plurality of static turbine vane rings 22 that are fixed relative to the central reference axis 11, and a plurality of bladed rotating wheel assemblies 24 as suggested in FIGS. 1 and 4. Each turbine vane ring 22 includes a plurality of turbine vane assemblies 10. The hot gases are conducted through the gas path 18 and interact with the bladed wheel assemblies 24 to cause the bladed wheel assemblies 24 to rotate about the central reference axis 11. The turbine vane rings 22 are positioned to direct the gases toward the bladed wheel assemblies 24 with a desired orientation.

The loads received by the outer and inner vane supports 26, 28 from the turbine vanes 12, 13 and/or other components of the gas turbine engine 110 may impart a rotation on the inner vane support 28 and correspondingly the vanes 12, 13 included in the turbine vane ring 22. The resulting rotation may result in increased leakage. To minimize twisting/rotation of the inner vane support 28, the second spar 32 extends between the outer and inner vane supports 26, 28 to provide another support point and anti-rotate the inner vane support 28 and correspondingly the vane 12, 13 and reduce twisting of the inner vane support 28 and the vanes 12, 13.

In the illustrative embodiment, the each turbine vane assembly 10 is a vane doublet including a plurality of vanes 12, 13, the vane support assembly 14, and the spar system 16 having a plurality of spars 30, 32, 34, 36 as shown in FIG. 3. The plurality of turbine vanes 12, 13 includes a first turbine vane 12 and a second turbine vane 13 spaced apart circumferentially from the first turbine vane 12 as shown in FIGS. 2 and 3. Each of the turbine vanes 12, 13 is shaped to define a separate interior cavity 66, 67 that extends radially through each turbine vane 12, 13 as shown in FIG. 3. The first two spars 30, 32 extend through the interior cavity 66 of the first vane 12 and the other two spars 34, 36 extend through the interior cavity 67 of the second vane 13.

Figure 5:
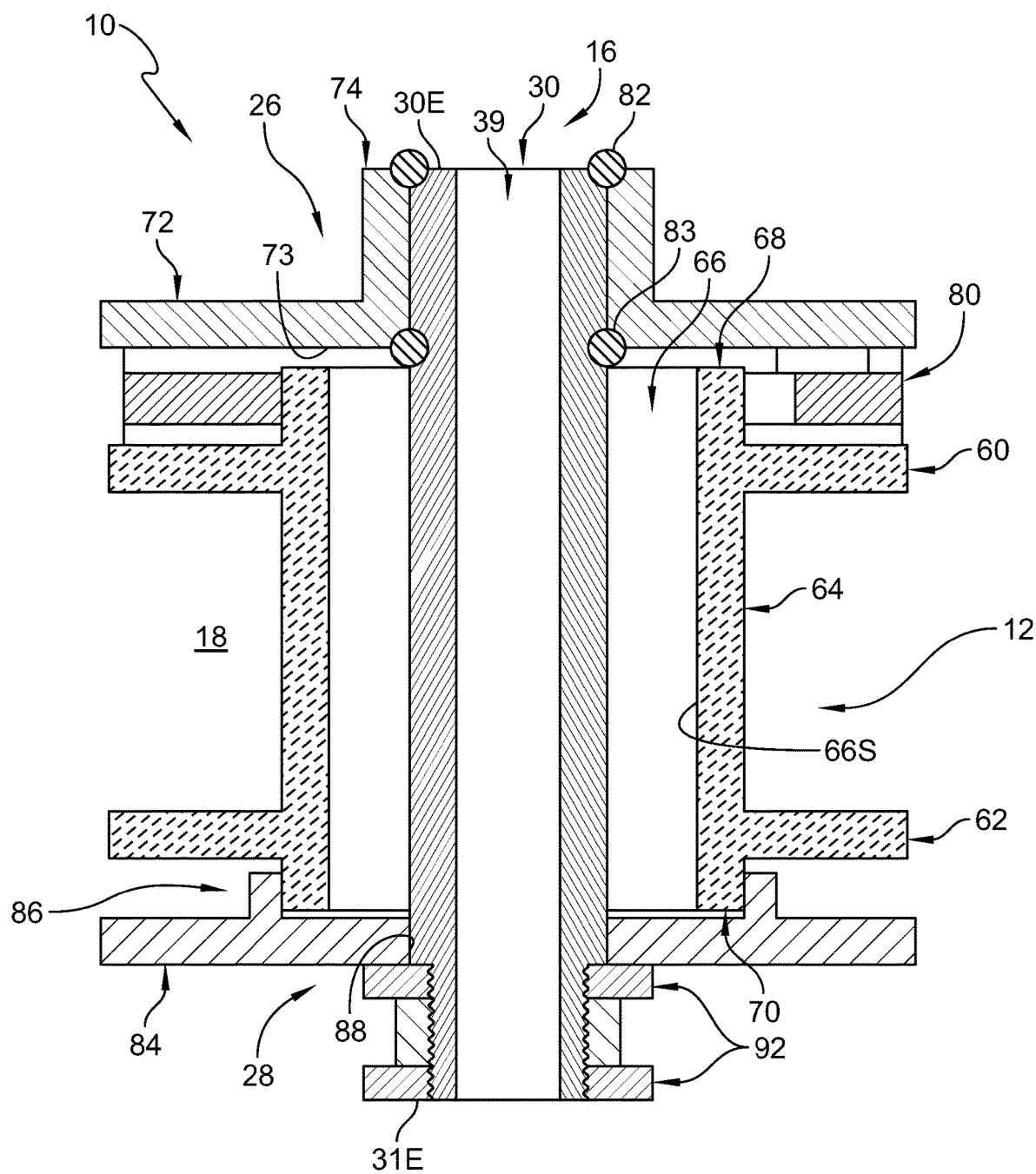
FIG. 5 is a diagrammatic section view of the turbine vane assembly of FIG. 2 taken along line 5-5 showing the outer vane support includes an outer mount platform configured to be coupled to a turbine case of the gas turbine engine and the spar mount extension that extends radially from the outer mount platform and receives the terminal end of the first spar, and further showing the first spar is welded to the outer vane support at both the terminal end of the first spar and the spar mount extension and an intersection of the first spar and a radially-inward facing surface of the outer mount platform of the outer vane support

Each turbine vane 12, 13 is shaped to include an outer platform 60, 61, an inner platform 62, 63, and an airfoil 64, 65 as shown in FIGS. 3, 5, and 6. The outer platform 60, 61 defines an outer boundary of the gas path 18. The inner platform 62, 63 is spaced apart radially from the outer platform 60, 61 relative to the axis 11 to define an inner boundary of the gas path 18. The airfoil 64, 65 extends radially between and interconnects the corresponding outer platform 60, 61 and the corresponding inner platform 62, 63. The airfoil 64, 65 is shaped to redirect gases flowing through the gas path 18 and to shield the corresponding spars 30, 32, 34, 36 extending therethrough from the hot gases in the gas path 18. The airfoil 64 of the vane 12 has a leading edge 64LE, a trailing edge 64TE, a pressure side 64PS, a suction side 64SS as shown in FIG. 6.

In the illustrative embodiment, the outer vane support 26 is located radially outward of the outer platforms 60, 61 and the inner vane support 28 is located radially inward of the inner platforms 62, 63 as shown in FIG. 3. The inner vane support 28 is located radially inward of the outer vane support 26 to locate the vanes 12, 13 radially therebetween.

Each airfoil 64, 65 is also formed to define the interior cavity 66, 67 as shown in FIGS. 3, 5, and 6. Each interior cavity 66, 67 extends radially into the airfoil 64, 65. Illustratively, the interior cavity 66, 67 extends radially entirely through the outer platform 60, 61, the inner platform 62, 63, and the airfoil 64, 65.

In the illustrative embodiment, each vane 12, 13 further includes an outer mount 68, 69 and an inner mount 70, 71 as shown in FIGS. 3 and 5. The outer mount 68, 69 extends radially outward from the outer platform 60, 61. The inner mount 70, 71 extends radially inward from the inner platform 62, 63.

The outer vane support 26 includes the outer mount platform 72 and a plurality of spar mount extensions 74, 75, 76, 77. The outer mount platform 72 extends circumferentially at least partway about the axis 11 and is configured to be coupled to the turbine case 20 of the gas turbine engine 110. The plurality of spar mount extensions 74, 75, 76, 77 extend radially from the outer mount platform 72.

In the illustrative embodiment, the plurality of spar mount extensions 74, 75, 76, 77 include a first spar mount extension 74, a second spar mount extension 76, a third spar mount extension 75, and a fourth spar mount extension 77 as shown in FIGS. 3 and 5. Each of the spar mount extensions 74, 75, 76, 77 extend radially from the outer mount platform 72. The second spar mount extension 76 is spaced apart axially from the first spar mount extension 74. The third spar mount extension 75 is spaced apart circumferentially from the first spar mount extension 74. The fourth spar mount extension 77 is spaced apart axially from the third spar mount extension 75 and circumferentially from the second spar mount extension 76.

In the illustrative embodiment, each of the spars 30, 32, 34, 36 extends through the outer mount platform 72 into the corresponding spar mount extension 74, 75, 76, 77. The first spar 30 extends radially through the outer mount platform 72 into the first spar mount extension 74. The second spar 32 extends radially through the outer mount platform 72 into the second spar mount extension 76. The third spar 34 extends radially through the outer mount platform 72 into the third spar mount extension 75. The fourth spar 36 extends radially through the outer mount platform 72 into the fourth spar mount extension 77. In this way, the terminal ends 30E, 32E, 34E, 36E of the plurality of spars 30, 32, 34, 36 extend radially outward of the outer mount platform 72.

The inner vane support 28 includes an inner mount platform 84 and airfoil-shaped ridges 86, 87, and fasteners 92, 93 as shown in FIG. 3. The inner mount platform 84 extends circumferentially at least partway about the axis 11. Each airfoil-shaped ridge 86, 87 extends radially outward form the inner mount platform 84 and receives the inner mount 70, 71 of the corresponding vane 12, 13. Each airfoil-shaped ridge 86, 87 is engaged with the corresponding inner mount 70, 71 to transfer the force loads. The fasteners 92, 93 couple to a radial inner end 31E, 35E of the corresponding spar 30, 34.

In the illustrative embodiment, the inner mount platform 84 is shaped to include first spar holes 88, 89 and second spar holes 90, 91 as shown in FIG. 3. The first spar holes 88, 89 extend through the inner mount platform 84. The second spar holes 90, 91 are spaced apart axially from the first spar holes 88, 89. The second spar holes 90, 91 extend into the inner mount platform 84.

The first spar 30 extends through the first spar hole 88, while the third spar 34 extends through the first spar hole 89 spaced apart circumferentially from the first spar hole 88. The second spar 32 extends into the second spar hole 90, while the fourth spar 36 extends into the second spar hole 91 spaced apart circumferentially from the second spar hole 90. The connection between the second and fourth spars 32, 36 with the inner mount platform 84 prevents twisting of the turbine vane assembly 10.

Each of the spars 30, 32, 34, 36 extends between the outer vane support 26 and the inner vane support 28 to provide the mechanical linkage between the outer and inner vane supports 26, 28. Each of the spars 30, 32, 34, 36 may be coupled to the outer and inner vane supports 26, 28. In the illustrative embodiment, the spars 30, 32, 34, 36 are welded to the outer vane support 26. The corresponding spars 30, 32 for the vane 12 are substantially similar to the corresponding spars 34, 36 for the vane 13. Only the spars 30, 32 for the first vane 12 are described further; however, description of the spars 30, 32 applies to the spars 34, 36 for the other vane 13 as will be understood.

In the illustrative embodiment, the first spar 30 is welded to the outer vane support 26 at the terminal end 30E of the first spar 30 and the first spar mount extension 74 of the outer vane support 26 as suggested by the weld 82 as shown in FIG. 5. Alternatively, the first spar 30 may be welded to the outer vane support 26 at an intersection of the first spar 30 and a radially-inward facing surface 73 of the outer mount platform 72 of the outer vane support 26 as suggested by the weld 83 as shown in FIG. 5. In the illustrative embodiment, the first spar 30 is welded to the outer vane support 26 at both the terminal end 30E of the first spar 30 and the first spar mount extension 74 and the intersection of the first spar 30 and the radially-inward facing surface 73 of the outer mount platform 72 as shown in FIG. 5.

In other embodiments, the radially outer end 30E of the first spar 30 may be threaded like the inner radial end 31E of the first spar 30 as shown in FIG. 5. The first spar mount extension 74 may be configured to mate with threads on the radially outer end 30E of the first spar 30.

In the illustrative embodiment, the first spar 30 extends radially through the inner mount platform 84 so that an inner terminal end 31E is located radially inward of the inner mount platform 84 as shown in FIG. 5. The radially inner end 31E is threaded to mate with the fasteners 92.

In the illustrative embodiment, the first support spar 30 has a circular cross section and the second support spar 32 has an oblong cross section as shown in FIG. 6. The second support spar 30 has a smaller diameter/thickness comparted to the first support spar 30 in the illustrative embodiment.

The first support spar 30 is shaped to include a cooling channel 39 as shown in FIGS. 5 and 6. The cooling channel 39 that extends radially through the first spar 30 to transfer cooling air radially through the turbine vane assembly 10 radially inward of the inner vane support 28.

A method of assembling the turbine vane assembly 10 may include several steps. First the spars 30, 32, 34, 36 may be coupled to the outer vane support 26. The outer radial end 30E of the first spar 30 is coupled to the outer vane support 26 and the outer radial end 32E of the second spar 32 is coupled to the outer vane support 26 at a location spaced apart axially from the first spar 30 relative to the axis 11. The outer radial end 34E of the third support spar 34 is coupled to the outer vane support 26 at a location spaced apart circumferentially from the first spar 30. The outer radial end 36E of the fourth spar 36 is coupled to the outer vane support 26 at a location spaced apart axially from the third spar 34 and circumferentially from the second spar 32.

Once the spars 30, 32, 34, 36 are coupled to the outer vane support 26, the method includes arranging the spars 30, 32, 34, 36 to extend through the corresponding vane 12, 13 so that the outer vane support 26 is located radially outward of the outer platforms 60, 61 of the vanes 12, 13. The first spar 30 and the second spar 32 are arranged to extend radially inward through the interior cavity 66 of the first vane 12. The third spar 34 and the fourth spar 36 are arranged to extend radially inward through the interior cavity 67 of the second vane 12.

Then the inner radial ends of each spar 30, 32, 34, 36 is coupled to the inner vane support 28 so that the inner vane support 28 is spaced apart radially from the outer vane support 26 to locate the vanes 12, 13 radially therebetween. For example, the inner radial end 31E of the first spar 30 is coupled to the inner vane support 28 by inserting the inner radial end 31E through the hole 88 in the inner mount platform 84. The inner radial end of the second spar 32 is inserted into the hole 90. This is repeated for the other spars 34, 36.

Figure 7:
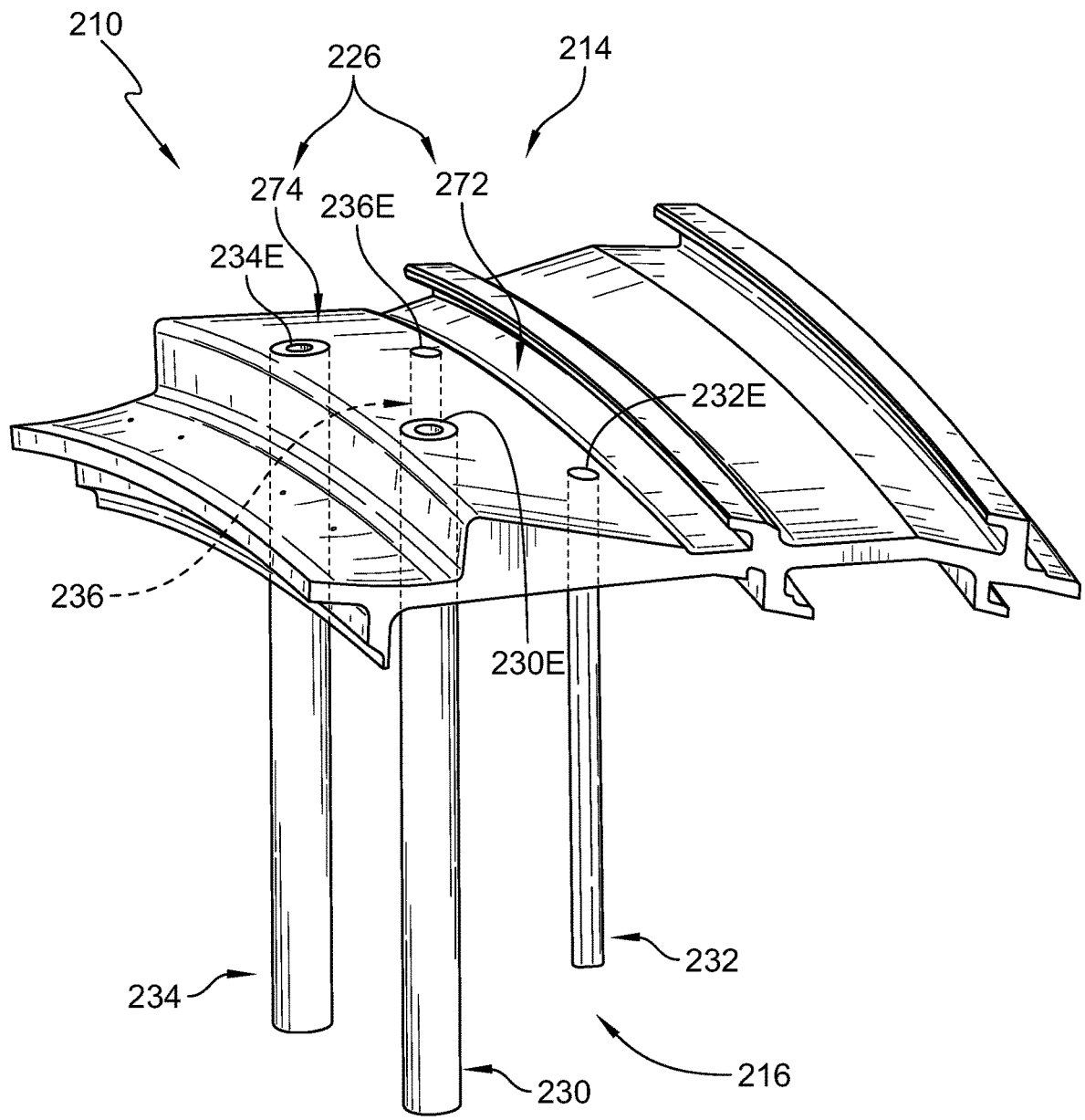
FIG. 7 is a perspective view of a portion of another embodiment of a turbine vane assembly adapted for using in the gas turbine engine of FIG. 1 showing the turbine vane assembly comprises an outer vane support and a spar system having a plurality of spars, the outer vane support including an outer carrier platform and a single spar mount extension that extends radially from the outer mount platform, and further showing each of the spars extends radially through the outer mount platform into the spar mount extension.

Another embodiment of a turbine vane assembly 210 in accordance with the present disclosure is shown in FIG. 7.

The turbine vane assembly 210 is substantially similar to the turbine vane assembly 10 shown in FIGS. 1-6 and described herein. Accordingly, similar reference numbers in the 200 series indicate features that are common between the turbine vane assembly 10 and the turbine vane assembly 210. The description of the turbine vane assembly 10 is incorporated by reference to apply to the turbine vane assembly 210, except in instances when it conflicts with the specific description and the drawings of the turbine vane assembly 210.

The turbine vane assembly 210 includes turbine vanes, a metallic vane support assembly 214, and a spar system 216 as shown in FIG. 7. The metallic vane support assembly 214 has an outer vane support 226 that extends circumferentially relative to an axis 11. The spar system 216 includes a plurality of spars 230, 232, 234, 236 that are each coupled to the outer vane support 226. Each of the spars 230, 232, 234, 236 extends radially inward from the outer vane support 226.

The outer vane support 226 includes an outer mount platform 272 and a single spar mount extension 274 as shown in FIG. 7. The outer mount platform 272 extends circumferentially at least partway about the axis 11. The spar mount extension 274 extends radially outward from the outer mount platform 272. Each of the spars 230, 232, 234, 236 extend radially through the outer mount platform 272 into the spar mount extension 274 so that the terminal ends 230E, 232E, 234E, 236E of the plurality of spars 230, 232, 234, 236 extend radially outward of the outer mount platform 72.

The single spar mount extension 275 may minimize machining the outer vane support 226. By forging a profiled ring section then segmenting to produce individual outer vane supports 226, the cost is further reduced. This alternative would likely be heavier than the embodiment in FIGS. 1-6; however, the mass can be traded against the additional stiffness.

Figure 8:
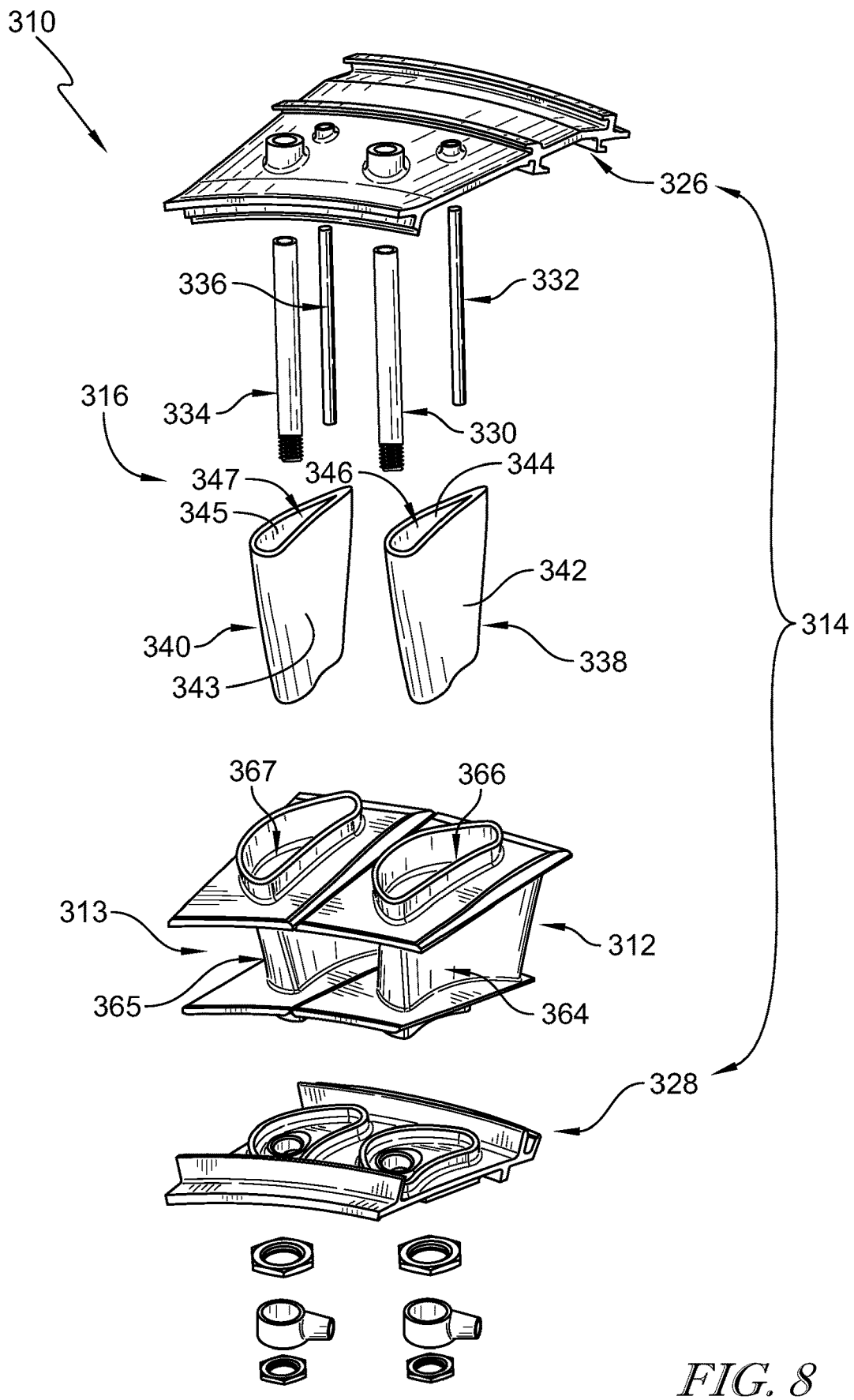
FIG. 8 is an exploded view of another embodiment of a turbine vane assembly adapted for using in the gas turbine engine of FIG. 1 showing the turbine vane assembly comprises a turbine vane, a vane support assembly, and a spar system including a plurality of spars and spar shields each configured to extend around corresponding spars so as to be located between the turbine vane and the corresponding spars when assembled.
Figure 9:
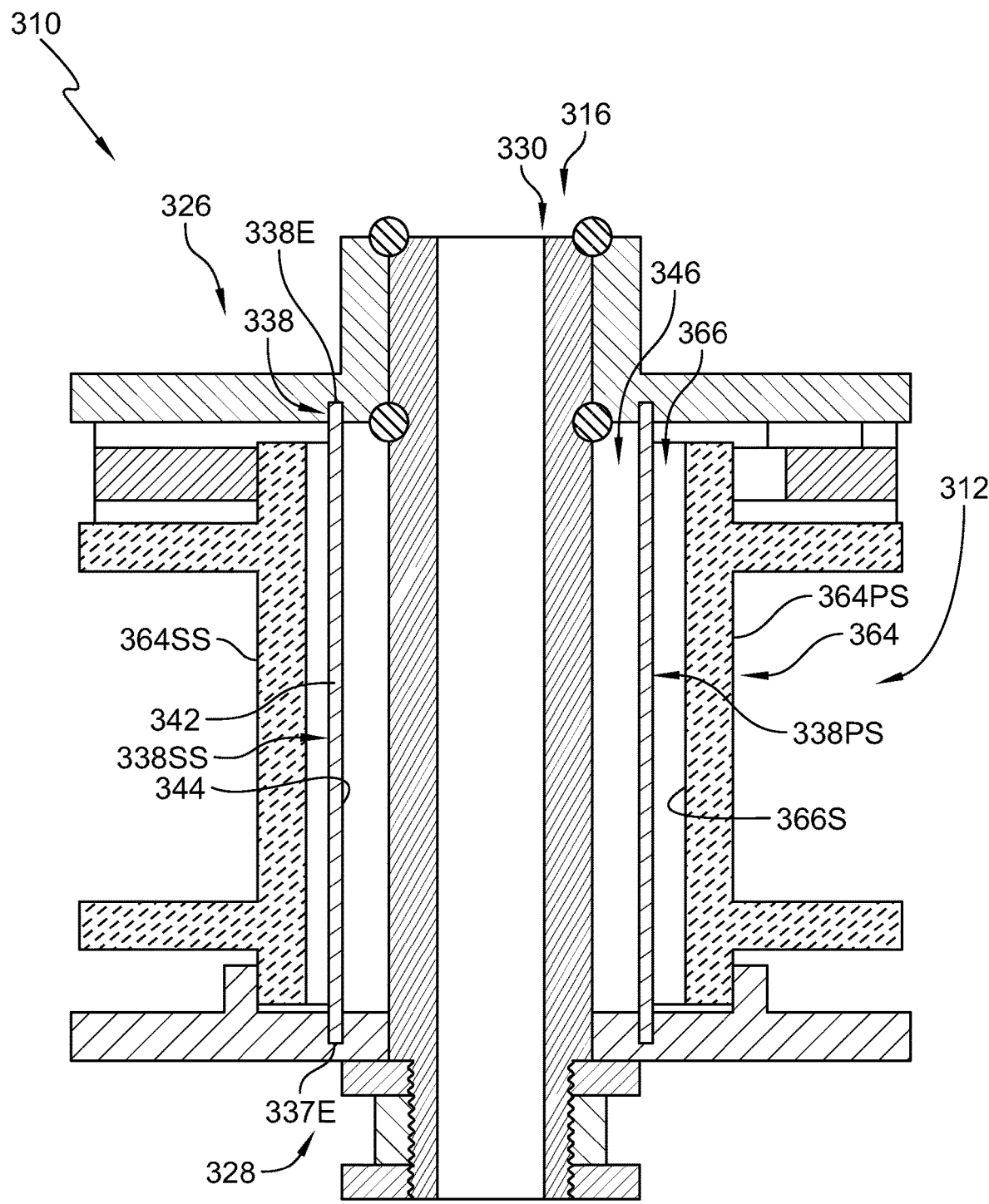
FIG. 9 is a diagrammatic section view of the turbine vane assembly of FIG. 8 showing the spar shield extends radially between an outer vane support and an inner vane support included in the vane support assembly.
Figure 10:
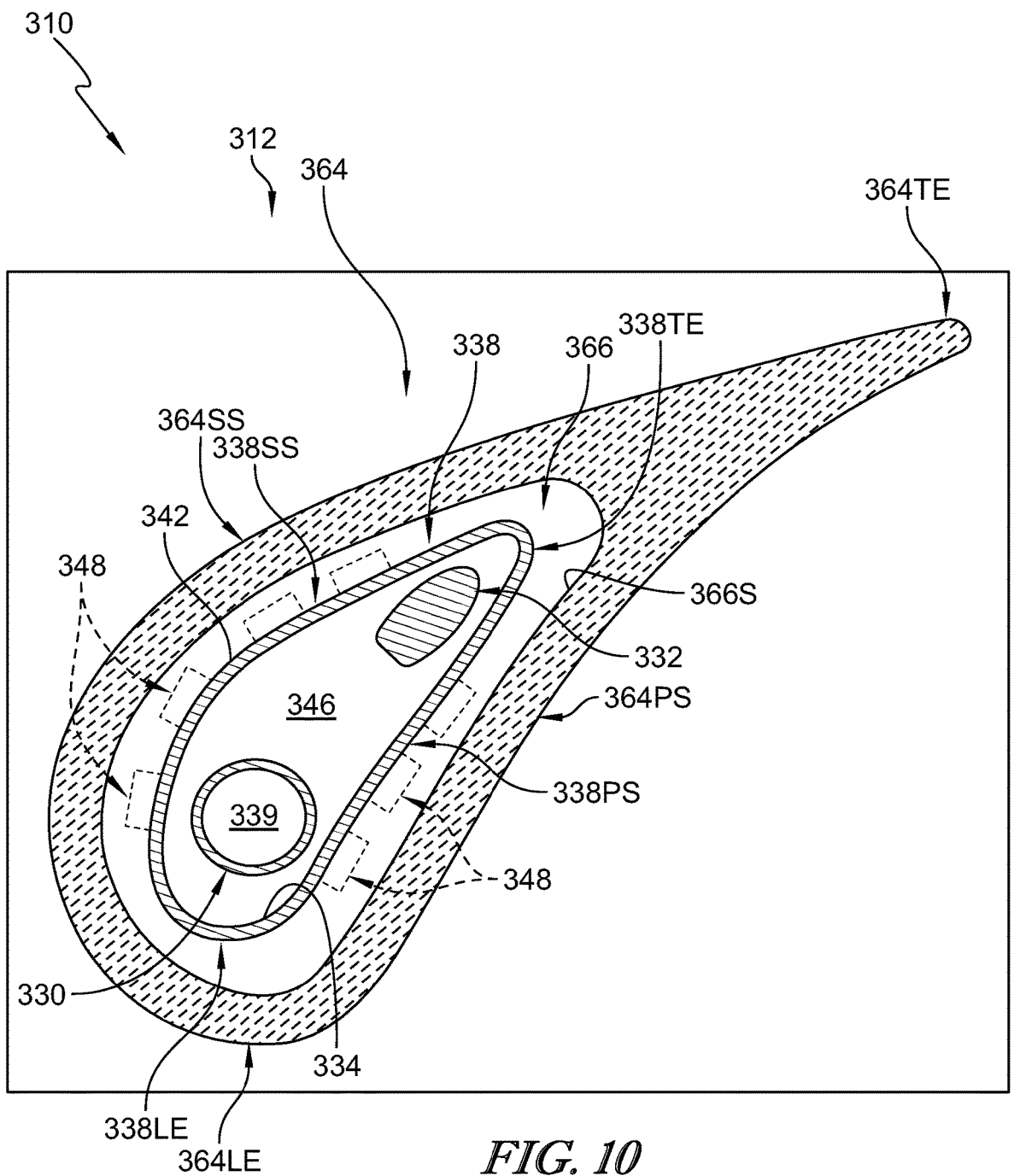
FIG. 10 is a diagrammatic section view of the turbine vane assembly of FIG. 8 showing the spar shield has an airfoil shape defining leading and trailing edges and pressure and suction sides that extend axially between and interconnect the leading and trailing edges, and further showing the spar shield may further include cooling features spaced apart along one of the pressure side and the suction side that extend from an exterior surface of the spar shield toward the vane.

Another embodiment of a turbine vane assembly 310 in accordance with the present disclosure is shown in FIGS. 8-10. The turbine vane assembly 310 is substantially similar to the turbine vane assembly 10 shown in FIGS. 1-6 and described herein. Accordingly, similar reference numbers in the 300 series indicate features that are common between the turbine vane assembly 10 and the turbine vane assembly 310. The description of the turbine vane assembly 10 is incorporated by reference to apply to the turbine vane assembly 310, except in instances when it conflicts with the specific description and the drawings of the turbine vane assembly 310.

The turbine vane assembly 310 includes turbine vanes 312, 313, a metallic vane support assembly 314, and a spar system 316 as shown in FIGS. 8-10. The metallic vane support assembly 314 has an outer vane support 326 and an inner vane support 328 that each extend circumferentially relative to an axis 11. The spar system 316 extends between the outer and inner vane supports 326, 328.

The spar system 316 includes a plurality of spars 330, 332, 334, 336 and spar shields 338, 340 as shown in FIGS. 8-10. The spars 330, 332 extend radially inward from the outer vane support 26 through an interior cavity 366 of the first vane 312, while the spars 334, 336 extend radially inward from the outer vane support 326 through an interior cavity 367 of the second vane 313. Each of the spar shields 338, 340 extends radially between the outer and inner vane supports 326, 328 through the corresponding interior cavity 366, 367 of the ceramic matrix composite vane 312, 313.

The spar shields 338, 340 are arranged to extend around the corresponding spars 330, 332, 334, 336 so that the spar shield 338, 340 is located between the corresponding vane 312, 313 and the corresponding spars 330, 332, 334, 336. The first spar shield 338 is arranged to extend around the first and second spars 330, 332 so that the spar shield 338 is located between the first vane 312 and the first and second spars 330, 332. The second spar shield 340 is arranged to extend around the third and fourth spars 334, 336 so that the spar shield 340 is located between the second vane 313 and the third and fourth spars 334, 336.

Each of the spar shields 338, 340 includes an exterior surface 342, 343 and an interior surface 344, 345 as shown in FIGS. 8-10. The exterior surface 342, 343 faces the interior cavity 366, 367 of the ceramic matrix composite vane 312, 313. The interior surface 344, 345 is opposite the exterior surface 342, 343 and defines an inner passageway 346, 347.

The first and second spars 330, 332 extend through the inner passageway 346 of the spar shield 338 so that the spar shield 338 is located between the ceramic matrix composite vane 312 and the first and second spars 330, 332. The third and fourth spars 334, 336 are configured to extend through the inner passageway 347 of the spar shield 340 so that the spar shield 340 is located between the ceramic matrix composite vane 313 and the third and fourth spars 334, 336.

The spar shields 338, 340 define an airfoil shape in the illustrative embodiment. The spar shield 340 are substantially similar to the spar shield 338. Only the spar shield 338 is described further; however, description of the spar shield 338 applies to the spar shield 340 as will be understood.

Like the airfoil 364 of the vane 312 that has a leading edge 364LE, a trailing edge 364TE, a pressure side 364PS, a suction side 364SS, the spar shield 338 has an airfoil shape as shown in FIGS. 8 and 10. The spar shield 338 is shaped to define a leading edge 338LE, a trailing edge 338TE spaced apart axially from the leading edge 338LE, a pressure side 338PS, and a suction side 338SS spaced apart circumferentially form the pressure side 338PS as shown in FIG. 10. The pressure and suction sides 338PS, 338SS extend between and interconnect the leading and trailing edges 338LE, 338TE.

The first spar 330 is adjacent the leading edge 338LE of the spar shield 338, while the second spar 332 is adjacent the trailing edge 338TE as shown in FIG. 10. The leading edge 338LE is spaced axially forward of the first spar 330. The trailing edge 338TE is spaced axially aft of the second spar 332.

In some embodiments, the spar shield 338 may further include cooling features 348 as suggested in FIG. 10. The cooling features 348 may extend from the exterior surface 342 of the spar shield 338 toward the vane 312.

The cooling features 348 may be spaced apart along one of the pressure side 338PS and the suction side 338SS as shown in FIG. 10. In other embodiments, the cooling features 348 may extend along one of the pressure side 338PS and the suction side 338SS.

Both the cooling features 348 and the exterior surface 342 of the spar shield 338 are spaced apart from an interior surface 366S of the vane 312 as shown in FIG. 10. The cooling features 348 and the exterior surface 342 of the spar shield 338 are spaced apart from the interior surface 366S of the vane 312 so as not to contact the vane 312.

In the illustrative embodiment, the radial outer and inner ends 338E, 337E of the spar shield 338 extend into the outer vane support 326 and the inner vane support 328 as shown in FIG. 9. The radial outer end 338E of the spar shield 338 extends into the outer vane support 326 and the radial inner end 337E of the spar shield 33

A method of assembling the turbine vane assembly 310 may include several steps. First the spars 330, 332, 334, 336 may be coupled to the outer vane support 326. Once the spars 330, 332, 334, 336 are coupled to the outer vane support 326, the method includes arranging each of the spar shields 338, 340 around the corresponding spars 330, 332, 334, 336. The first and second spars 330, 332 are arranged to extend into the inner passageway 346 of the first spar shield 338 so that the first spar shield 338 extends around the first and second spars 330, 332. The third and fourth spars 334, 3336 are arranged to extend into the inner passageway 347 of the second spar shield 340 so that the second spar shield 340 extends around the third and fourth spars 334, 336.

The spars 330, 332 and the spar shield 338 are then arranged to extend radially inward through the interior cavity 366 of the first vane 312 so that the spar shield 338 is located between the spars 330, 332 and the vane 312. The spars 334, 336 and the spar shield 340 are arranged to extend radially inward through the interior cavity 367 of the second vane 313 so that the spar shield 340 is located between the spars 334, 336 and the vane 313.

Then the inner radial ends of each spar 330, 332, 334, 336 is coupled to the inner vane support 328 so that the inner vane support 28 is spaced apart radially from the outer vane support 26 to locate the vanes 312, 313 and the spar shields 338, 340 radially therebetween.

Figure 11:
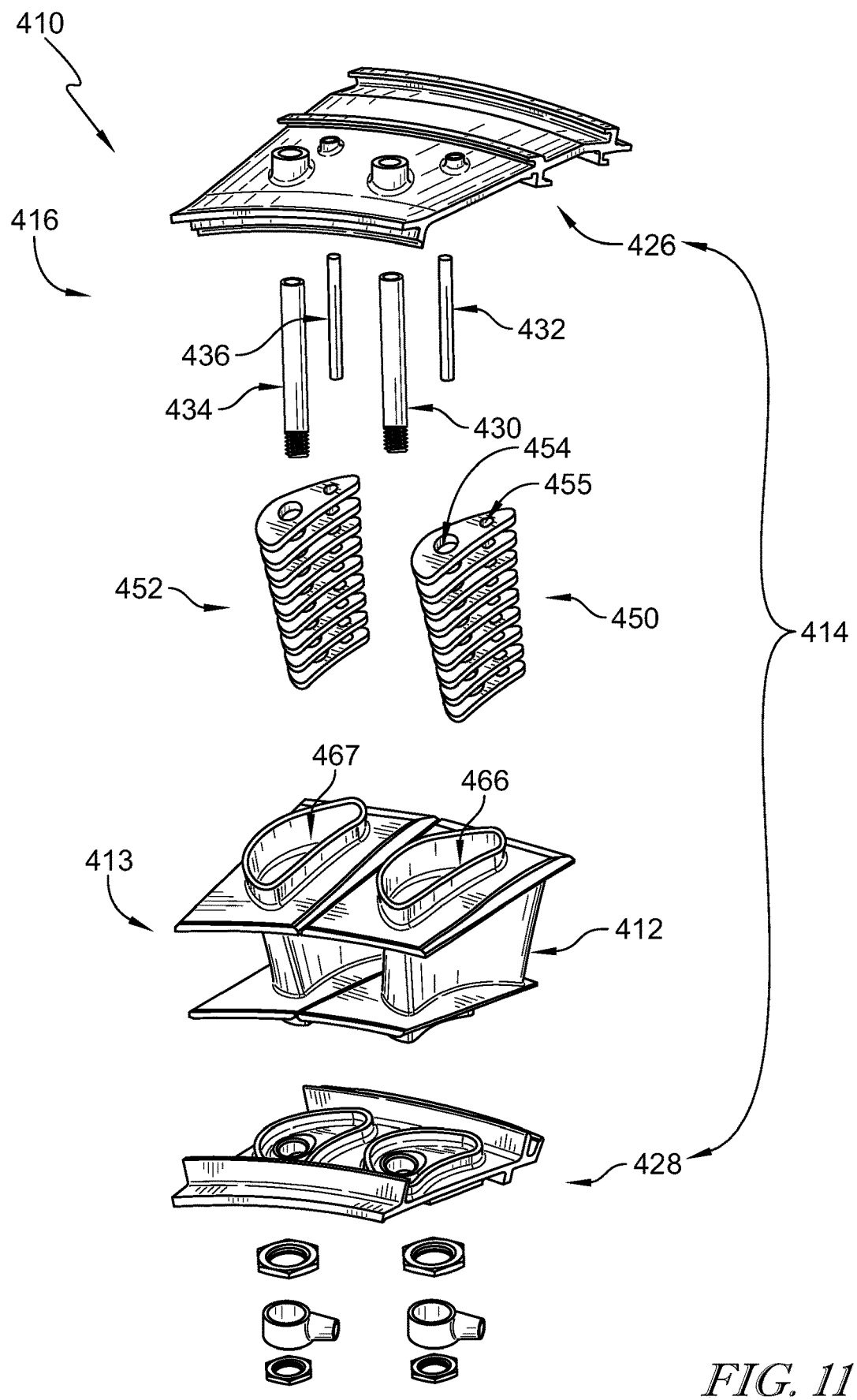
FIG. 11 is an exploded view of another embodiment of a turbine vane assembly adapted for using in the gas turbine engine of FIG. 1 showing the turbine vane assembly comprises a turbine vane, a vane support assembly, and a spar system including a plurality of spars, a first set of spar plates, and a second set of spar plates, the plurality of spar plates included in each of the sets configured to be stacked on top of one another to form an outer profile with an airfoil shape.
Figure 12:
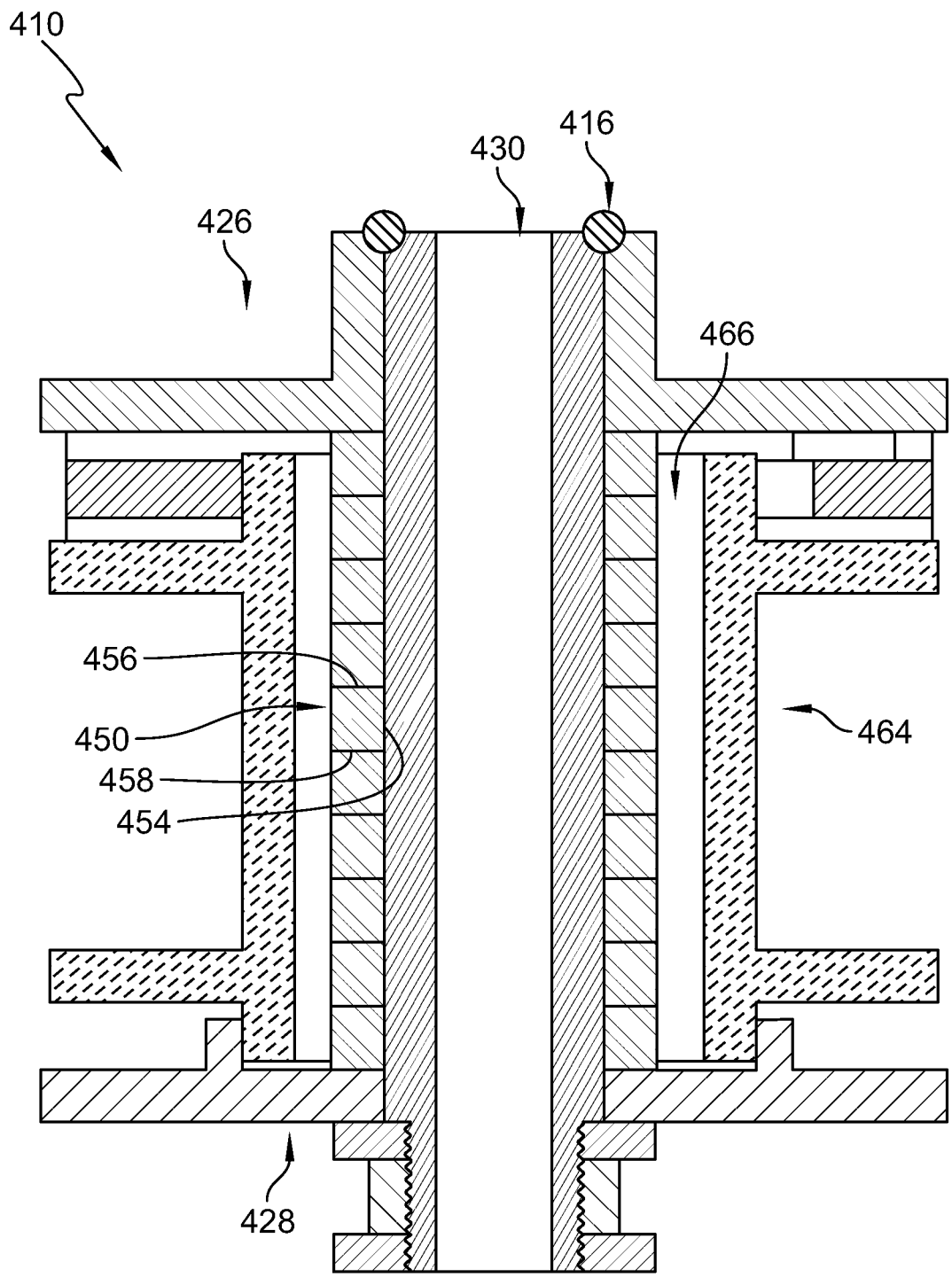
FIG. 12 is a diagrammatic section view of the turbine vane assembly of FIG. 11 showing the plurality of spar plates extend radially between an outer vane support and an inner vane support included in the vane support assembly.
Figure 13:
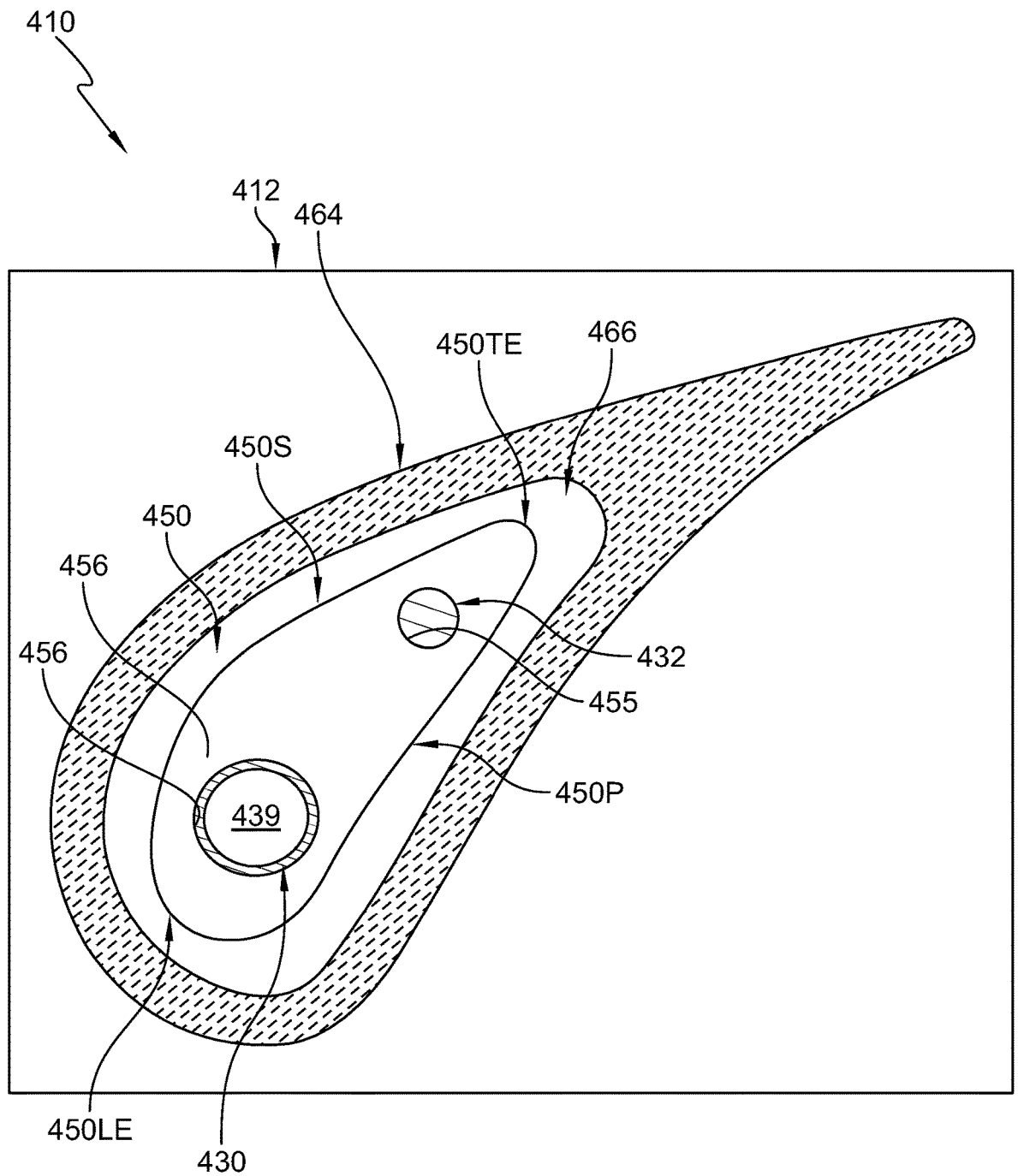
FIG. 13 is a diagrammatic section view of the turbine vane assembly of FIG. 11 showing the airfoil shape of each of the spar plates defines leading and trailing edges and pressure and suction sides that extend axially between and interconnect the leading and trailing edges.

Another embodiment of a turbine vane assembly 410 in accordance with the present disclosure is shown in FIGS. 11-13. The turbine vane assembly 410 is substantially similar to the turbine vane assembly 10 shown in FIGS. 1-6 and described herein. Accordingly, similar reference numbers in the 400 series indicate features that are common between the turbine vane assembly 10 and the turbine vane assembly 410. The description of the turbine vane assembly 10 is incorporated by reference to apply to the turbine vane assembly 410, except in instances when it conflicts with the specific description and the drawings of the turbine vane assembly 410.

The turbine vane assembly 410 includes turbine vanes 412, 413, a metallic vane support assembly 414, and a spar system 416 as shown in FIGS. 11 and 12. The metallic vane support assembly 414 has an outer vane support 426 and an inner vane support 428 that each extend circumferentially relative to an axis 11. The spar system 416 extends between the outer and inner vane supports 426, 428.

The spar system 416 includes a plurality of spars 430, 432, 434, 436 and a plurality of spar plates 450, 452 as shown in FIGS. 11-13. The spars 430, 432 extend radially inward from the outer vane support 26 through an interior cavity 466 of the vane 412, while the spars 434, 436 extend radially inward from the outer vane support 426 through an interior cavity 467 of the vane 413. The plurality of spar plates 450, 452 includes a first set of spar plates 450 for the first and second spars 330, 332 and a second set of spar plates 452 for the third and fourth spars 334, 336.

Each of the spar plates 450, 452 of the first and second sets are stacked radially between the outer vane support 426 and the inner vane support 428. The spar plates 450, 452 cooperate to form an outer profile with an airfoil shape. The spar plates 452 are substantially similar to the spar plates 450. Only the spar plates 450 are described further; however, description of the spar plates 450 applies to the spar plates 452 as will be understood.

The airfoil shape of the spar plates 450 have a leading edge 450LE, a trailing edge 450TE spaced apart axially from the leading edge 450LE, a pressure side 450PS, and a suction side 450SS, spaced apart circumferentially form the pressure side 450PS as shown in FIG. 13. The pressure and suction sides 450PS, 450SS extend between and interconnect the leading and trailing edges 450LE, 450TE.

Each of the spar plates 450 have through holes 454, 455 as shown in FIGS. 11-13. The first and second spars 430, 432 extend radially through the corresponding holes 454, 455 in the first set of spar plates 450, while the third and fourth spars 434, 436 extend radially through the holes in the second set of spar plates 452.

Each of the spar plates 450 is also shaped to define an outer surface 456 and an inner surface 458 as shown in FIGS. 12 and 13. The inner surface 458 is spaced apart radially from the outer surface 456 to define a thickness of the spar plate 450. The outer and inner surfaces 456, 458 confront adjacent spar plates 450 when the plates 450 are stacked.

A method of assembling the turbine vane assembly 410 may include several steps. First the spars 430, 432, 434, 436 may be coupled to the outer vane support 426. Once the spars 430, 432, 434, 436 are coupled to the outer vane support 426, the method includes arranging each of the sets of spar plates 450, 452 on the corresponding spars 430, 432, 434, 436. The first set of spar plates 450 are arranged on the first and second spars 330, 332 so that the spar plates 450 are stacked radially along the radial length of the spars 330, 332. Similarly, the second set of spar plates 452 are arranged on the third and fourth spars 434, 436 so that the spar plates 452 are stacked radially along the radial length of the spars 434, 436.

The spars 430, 432 with the assembled spar plates 450 are then arranged to extend radially through the interior cavity 466 of the first vane 412. Similarly, the spars 434, 436 with the assembled spar plates 452 are arranged to extend radially through the interior cavity 467 of the second vane 413. In this way, the outer vane support 426 is located radially outward of the vanes 412, 413.

The inner radial ends of each spar 430, 432, 434, 436 are then coupled to the inner vane support 428. The spars 430, 432, 434, 436 are coupled to the inner vane support 428 so that the inner vane support 428 is spaced apart radially from the outer vane support 426 to locate the vanes 412, 413 and the spar plates 450, 452 radially therebetween.

The vane assembly 10 includes a ceramic matrix composite vane 12, 13 and an interstage seal 94. The interstage seal 94 induces an axial load onto the spar, while the vane 12, 13 induces an axial load component in addition to a circumferential load component. To minimise deflections under load in an effort to maximise sealing performance, the vane assembly 10 includes a vane support assembly 14 and spar system 16.

The spar system 16 includes a plurality of spars 30, 32, 34, 36 that are welded to an outer vane support 26 of the vane support assembly 14. A range of high temperature capable materials and manufacturing methods are suitable for the sub-elements. The outer vane support 26 and the spars 30, 32, 34, 36 are substantially cheaper to manufacture than the conventional alterative which is a cast structure with integral spars.

The part includes a pair of spars 30, 32, 34, 36 per vane 12, 13. One of the spars 30, 34 is larger than the other 32, 36. The spars 30, 32, 34, 36 fit inside the corresponding vane 12, 13 to support the inner vane support 28 and transmit loads from the interstage seal 94 outboard. However, the spars 30, 32, 34, 36 do not contact the corresponding vane 12, 13 during engine operation.

Each of the spars 30, 32, 34, 36 have a constant cross-section to increase the stiffness of the structure and to anti-rotate the inner vane support 28. In some embodiments, the turbine vane assembly 10 may include a single spar 30, 34 per vane 12, 13 with a constant cross-section. Each of the spars 30, 34 includes a threaded feature at the bottom end so that nutted fasteners at the inboard pre-load the assembly together.

The spar mount extensions 74, 75, 76, 77 extend from the outer mount platform 72. The ends of each spar 30, 32, 34, 36 extend into the spar mount extension 74, 75, 76, 77 radially outward of the outer mount platform 72 to increase the second moment of area of the vane support assembly 14 and the spar system 16, increasing the stiffness and therefore, reducing the deflection. It may be important to minimise this deflection to avoid opening secondary air system gaps that reduce the engine cycle efficiency.

In some embodiments, the spars 30, 34 are solid. In the illustrative embodiment, the spars 30, 34 are hollow to permit cooling air to flow through the assembly 10. This would enable cooling flows to transit through the spars 30, 34 from the outboard source location to the inboard disc cavity location for cooling and sealing purposes. Alternatively, the coolant can be exhausted into the interior cavity 66, 67 of the vane 12, 13 to cool the structure.

In some embodiments, the spars 30, 32, 34, 36 have a circular or round cross-section. In other embodiments, the spars 32, 36 may have an oblong cross-section. In other embodiments, the spars 30, 32, 34, 36 may have a different cross-section as a means of maximising second moment of area within the space constraints. Furthermore, a non-round cross-section may be effective at anti-rotating the assembly 10.

The spars 30, 32, 34, 36 may be welded in with a number of joining processes (welding or brazing). In some embodiments, a partial penetration laser keyhole weld continuous or intermittent around the perimeter of the spar 30, 32, 34, 36 may be used. The weld may be applied to the outer extent of the spar 30, 32, 34, 36 and/or the inwardly facing surfaced 73 of the outer mount platform 72. In some embodiments, the spar 30, 32, 34, 36 may be formed with a flanged feature to separate the weld heating from the body of the spar 30, 32, 34, 36. This may also spread the loading area.

If the outer vane support 26 is cast, then the spar mount extensions 74, 75, 76, 77 may be machined. However, it may be possible to further reduce the cost by forging the outer vane support 226 with a single spar mount extension 274. The outer vane support 226 may be cast and then segmented to produce individual outer vane supports 226.

Compared to typical support systems, the vane support assembly 14 and the spar system 16 may have a lower stiffness; however, this concept is better suited reduce the interstage seal and vane loading. An advantage of the spar system 16 is that it may be easier to expand to a triple or quad span arrangement due to increased clearance in the internal cavity 66. 67. Additionally, increased stiffness may be added through the addition of a spar shield 338, 340 as shown in FIGS. 8-10 or a plurality of laser cut spar plates 450, 452 as shown in FIGS. 11-13.

In the embodiment of FIGS. 8-10, the spar system 316 includes a spar shield 338, 340 that extends around the corresponding spars 330, 332, 334, 336. The spar shields 338, 340 may act as a more conventional impingement tube creating an inner passageway 346, 347.

The spar shields 338, 340 may also incorporate the cooling features 348 in some embodiments. In other embodiments, the spar shield 338, 340 may be formed with corrugations to act as the cooling channels.

In the illustrative embodiment, the outer and inner ends of the spar shield 338, 340 may then be pre-loaded into recesses in the outer and inner vane supports 326, 328 as shown in FIG. 9. In other embodiments, rather than recesses, the spar shield 338, 340 may be located with stand-offs engaging on the spars 330, 332, 334, 336 and/or the vane 312, 313.

In the embodiment of FIGS. 11-13, the spar system 416 includes a plurality of profiled plates 450, 452. The plates 450, 452 are stacked together. The plates 450, 452 may be used to increase the stiffness of the spar system 416, yet will be relatively cheap to produce. By slotting the plates 450, 452 on the spars 430, 432, 434, 436, the plates 450, 452 are unable to move and can be aligned with a non-round spar. The plates 450, 452 would be trapped by the inner vane support 428 or they could be pre-loaded with a spring feature.

In the illustrative embodiment, the plates 450, 452 may be curved relative to the engine centreline. As an alternative, an adaptor piece (or a machined flat piece) may be created to interface 2-dimensional sheets with the outer mount platform 472, as modelled is a revolved 2-dimensional section so the inner face is curved.

Cooling features may be created on the laminated plates 450, 452 directly by using a larger section for a sub-set of plates 450, 452 i.e. ribs directly cut into the exterior profile of one or more of the plates 450, 452. Depending on the plate thickness relative to the cooling feature height, the feature may be formed across multiple plates.

Additionally, pin-fin and rib features can be added as cooling features. Furthermore, light-weighting features may be cut within the laminates in addition to the pin-fin and rib features. There could also be fluid and/or sensor passageways through the laminates.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for use in a gas turbine engine, the turbine vane assembly comprises
    a ceramic matrix composite vane adapted to interact with hot gases flowing through a gas path of the gas turbine engine during use of the turbine vane assembly, the ceramic matrix composite vane including an outer platform, an inner platform spaced apart radially from the outer platform relative to an axis to define the gas path therebetween, and an airfoil that extends radially between the outer platform and the inner platform,
    a metallic vane support assembly that extends circumferentially relative to the axis and is configured to receive loads applied to the ceramic matrix composite vane during use of the turbine vane assembly, the metallic vane support assembly including an outer vane support located radially outward of the outer platform of the ceramic matrix composite vane and an inner vane support located radially inward of the inner platform of the ceramic matrix composite vane, and
    a spar system that includes a first spar that extends radially inward from the outer vane support through an interior cavity of the ceramic matrix composite vane and couples with the inner vane support so as to transfer loads applied to the inner vane support to the outer vane support and a second spar spaced apart axially from the first spar relative to the axis that extends radially inward from the outer vane support through the interior cavity of the ceramic matrix composite vane and couples with the inner vane support to transfer the loads applied to the inner vane support to the outer vane support and block twisting of the ceramic matrix composite vane during use of the turbine vane assembly, wherein the inner vane support includes an inner mount platform that extends circumferentially at least partway about the axis and an airfoil-shaped ridge that extends radially outward form the inner mount platform, the vane further includes an inner mount that extends radially inward from the inner platform, and the airfoil-shaped ridge receives the inner mount of the vane and is engaged with the inner mount to transfer the force loads from the ceramic matrix composite vane to the first spar, and wherein the interior cavity of the ceramic matrix composite vane extends through the outer platform, the inner platform, the inner mount, and the airfoil, the interior cavity is airfoil-shaped, and the first spar and the second spar are spaced apart from an interior surface that defines the interior cavity of the ceramic matrix composite vane.

2. The turbine vane assembly of claim 1, wherein the outer vane support includes an outer mount platform that extends circumferentially at least partway about the axis and is configured to be coupled to a turbine case of the gas turbine engine, a first spar mount extension that extends radially from the outer mount platform, and a second spar mount extension spaced apart axially from the first spar mount extension that extends radially from the outer mount platform, and wherein the first spar extends radially through the outer mount platform into the first spar mount extension and the second spar extends radially through the outer mount platform into the second spar mount extension so that terminal ends of the first and second spars extend radially outward of the outer mount platform.

3. The turbine vane assembly of claim 2, wherein the first spar is welded to the outer vane support at one of the terminal ends of the first spar and the first spar mount extension of the outer vane support and an intersection of the first spar and a radially-inward facing surface of the outer mount platform of the outer vane support.

4. The turbine vane assembly of claim 3, wherein the first spar is welded to the outer vane support at both the terminal end of the first spar and the first spar mount extension of the outer vane support and the intersection of the first spar and a radially-inward facing surface of the outer mount platform of the outer vane support.

5. The turbine vane assembly of claim 2, wherein a radially outer end of the first spar is threaded and the first spar mount extension is configured to mate with threads on the radially outer end of the first spar.

6. The turbine vane assembly of claim 2, wherein the spar system further includes a spar shield that extends radially between the outer mount platform and the inner vane support through the interior cavity of the ceramic matrix composite vane, the spar shield including an exterior surface that faces the interior cavity of the ceramic matrix composite vane and an interior surface that defines an inner passageway, and the first and second spars extend through the inner passageway of the spar shield so that the spar shield is located between the ceramic matrix composite vane and the first and second spars.

7. The turbine vane assembly of claim 6, wherein the spar shield is shaped to define a leading edge, a trailing edge spaced apart axially from the leading edge, a pressure side, and a suction side spaced apart circumferentially form the pressure side, the pressure and suction sides extend between and interconnect the leading and trailing edges, and the spar shield further includes cooling features spaced apart along one of the pressure side and the suction side that extend from the exterior surface of the spar shield toward the ceramic matrix composite vane.

8. The turbine vane assembly of claim 2, wherein the spar system further includes a plurality of spar plates that are stacked radially between the outer mount platform and the inner vane support, the plurality of spar plates cooperate to form an outer profile with an airfoil shape having a leading edge, a trailing edge spaced apart axially from the leading edge, a pressure side, and a suction side spaced apart circumferentially form the pressure side, the pressure and suction sides extend between and interconnect the leading and trailing edges, and the first and second spars extend radially through the plurality of spar plates.

9. The turbine vane assembly of claim 1, wherein the outer vane support includes an outer mount platform that extends circumferentially at least partway about the axis and is configured to be coupled to a turbine case of the gas turbine engine and a spar mount extension that extends radially from the outer mount platform, and wherein the first and second spars extend radially through the outer mount platform into the spar mount extension so that terminal ends of the first and second spars extend radially outward of the outer mount platform.

10. The turbine vane assembly of claim 1, wherein the first spar has a circular cross section and the second spar has an oblong cross section.

11. A turbine vane assembly for use in a gas turbine engine, the turbine vane assembly comprises
  a vane including an outer platform, an inner platform spaced apart radially from the outer platform relative to an axis, and an airfoil that extends radially between the outer platform and the inner platform,
  a vane support assembly including an outer vane support located radially outward of the outer platform of the vane and an inner vane support located radially inward of the inner platform of the vane, and
  a spar system that includes a first spar that extends radially inward from the outer vane support through an interior cavity of the vane and couples with the inner vane support and a second spar spaced apart axially from the first spar relative to the axis that extends radially inward from the outer vane support through the interior cavity of the vane and couples with the inner vane support,
  wherein the inner vane support includes an inner mount platform that extends circumferentially at least partway about the axis and an airfoil-shaped ridge that extends radially outward form the inner mount platform, the vane further includes an inner mount that extends radially inward from the inner platform, and the airfoil-shaped ridge receives the inner mount of the vane and is engaged with the inner mount to transfer the force loads from the ceramic matrix composite vane to the first spar, and
  wherein the interior cavity of the ceramic matrix composite vane extends through the outer platform, the inner platform, the inner mount, and the airfoil and the first spar and the second spar are spaced apart from an interior surface that defines the interior cavity of the ceramic matrix composite vane.

12. The turbine vane assembly of claim 11, wherein the outer vane support includes an outer mount platform that extends circumferentially at least partway about the axis, a first spar mount extension that extends radially from the outer mount platform, and a second spar mount extension spaced apart axially from the first spar mount extension that extends radially from the outer mount platform, and wherein the first spar extends radially through the outer mount platform into the first spar mount extension and the second spar extends radially through the outer mount platform into the second spar mount extension so that terminal ends of the first and second spars are located radially outward of the outer mount platform.

13. The turbine vane assembly of claim 12, wherein the first spar is welded to the outer vane support at one of the terminal ends of the first spar and the first spar mount extension of the outer vane support and an intersection of the first spar and a radially-inward facing surface of the outer mount platform of the outer vane support.

14. The turbine vane assembly of claim 12, wherein a radially outer end of the first spar is threaded and the first spar mount extension is configured to mate with threads on the radially outer end of the first spar.

15. The turbine vane assembly of claim 11, wherein the spar system further includes a spar shield that extends radially between the outer vane support and the inner vane support through the interior cavity of the vane, and wherein the first and second spars extend through the spar shield so that the spar shield is located between the vane and the first and second spars.

16. The turbine vane assembly of claim 11, wherein the spar system further includes a plurality of spar plates that are stacked radially between the outer vane support and the inner vane support, the plurality of spar plates cooperate to form an outer profile with an airfoil shape, and the first and second spars extend radially through the plurality of spar plates.

17. The turbine vane assembly of claim 11, wherein the first spar has a circular cross section and the second spar has an oblong cross section.

18. A method comprising
providing a vane comprising ceramic matrix composite materials, a vane support assembly comprising metallic materials, and a spar system, the vane including an outer platform, an inner platform spaced apart radially from the outer platform relative to an axis, an airfoil that extends from the outer platform to the inner platform, and the vane support assembly including an inner vane support and an outer vane support, and the spar system including a first spar and a second spar,
coupling a first radial end of the first spar to the outer vane support and coupling a first radial end of the second spar to the outer vane support at a location spaced apart axially from the first spar relative to the axis,
arranging the first spar to extend radially inward through an interior cavity of the vane and arranging the second spar to extend radially through the interior cavity of the vane so that the outer vane support is located radially outward of the outer platform of the vane, and
coupling a second radial end of the first spar spaced apart radially from the first radial end of the first spar to the inner vane support and coupling a second radial end of the second spar spaced apart radially from the first radial end of the second spar to the inner vane support so that the inner vane support is spaced apart radially from the outer vane support relative to the axis to locate the vane radially therebetween,
wherein the inner vane support includes an inner mount platform that extends circumferentially at least partway about the axis and an airfoil-shaped ridge that extends radially outward form the inner mount platform, the vane further includes an inner mount that extends radially inward from the inner platform,
wherein the interior cavity of the vane extends through the outer platform, the inner platform, the inner mount, and the airfoil and the first spar and the second spar are spaced apart from an interior surface that defines the interior cavity of the vane, and
wherein the method further comprises arranging the inner mount of the vane in the airfoil-shaped ridge of the inner vane support so that the airfoil-shaped ridge is engaged with the inner mount to transfer loads from the ceramic matrix composite vane to the first spar.

\* \* \* \* \*